United States Patent
Herrmann et al.

(10) Patent No.: US 9,843,827 B2
(45) Date of Patent: *Dec. 12, 2017

(54) PHYSICAL LAYER SIGNALLING FOR DIGITAL BROADCAST SYSTEM

(71) Applicant: Sun Patent Trust, New York, NY (US)

(72) Inventors: Frank Herrmann, Frankfurt (DE); Mihail Petrov, Bavaria (DE)

(73) Assignee: SUN PATENT TRUST, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/375,589

(22) Filed: Dec. 12, 2016

(65) Prior Publication Data

US 2017/0094328 A1    Mar. 30, 2017

Related U.S. Application Data

(60) Continuation of application No. 14/556,763, filed on Dec. 1, 2014, now Pat. No. 9,554,164, which is a
(Continued)

(30) Foreign Application Priority Data

Feb. 26, 2010 (EP) .................... 10002024

(51) Int. Cl.
*H04N 21/235* (2011.01)
*H04N 21/2389* (2011.01)
(Continued)

(52) U.S. Cl.
CPC ..... *H04N 21/23614* (2013.01); *H04N 21/235* (2013.01); *H04N 21/236* (2013.01);
(Continued)

(58) Field of Classification Search
CPC ...................................................... H04L 12/56
See application file for complete search history.

(56) References Cited

U.S. PATENT DOCUMENTS 5,835,730 A * 11/1998 Grossman ............ H04N 5/4401
341/60
7,558,882 B2   7/2009 Walsh et al.
(Continued)

FOREIGN PATENT DOCUMENTS

JP   2002-325230   11/2002
WO   01/15455     3/2001
(Continued)

OTHER PUBLICATIONS

International Search Report dated Jun. 21, 2011 in International (PCT) Application No. PCT/JP2011/001083.
European Search Report dated Aug. 25, 2010 in European Application No. EP 10 00 2024.
Written Opinion of the International Searching Authority dated Jun. 21, 2011 in International (PCT) Application No. PCT/JP2011/001083.
(Continued)

*Primary Examiner* — Andrew Chriss
*Assistant Examiner* — Voster Preval
(74) *Attorney, Agent, or Firm* — Wenderoth, Lind & Ponack, L.L.P.

(57) ABSTRACT

The present invention relates to a physical layer signalling in a digital broadcast network. In particular, for a digital broadcast network supporting a configuration with a plurality of physical layer pipes, a type indicator is signalled on physical layer for a pipe, the type indicator indicates the format of the input stream which may specify a transport stream, a generic stream or an IP stream. In addition, per physical layer pipe application of header and/or content compression to the user packet headers of the input stream is signalled. Another physical layer parameters are advantageously provided or extended in order to increase the flexibility and efficiency of the layer 1 signalling.

4 Claims, 23 Drawing Sheets

Related U.S. Application Data division of application No. 13/578,725, filed as application No. PCT/JP2011/001083 on Feb. 24, 2011, now Pat. No. 8,929,401.

(51) Int. Cl.

| | | |
|---|---|---|
| *H04N 21/435* | (2011.01) | |
| *H04N 21/236* | (2011.01) | |
| *H04N 21/434* | (2011.01) | |
| *H04N 21/4385* | (2011.01) | |
| *H04N 21/61* | (2011.01) | |
| *H04N 21/643* | (2011.01) | |

(52) U.S. Cl.
CPC ....... *H04N 21/2389* (2013.01); *H04N 21/435* (2013.01); *H04N 21/4345* (2013.01); *H04N 21/4385* (2013.01); *H04N 21/6112* (2013.01); *H04N 21/64315* (2013.01); *H04N 21/64322* (2013.01)

(56) References Cited

U.S. PATENT DOCUMENTS

| | | | | |
|---|---|---|---|---|
| 8,929,401 | B2* | 1/2015 | Herrmann | H04N 21/235 370/390 |
| 2005/0160184 | A1 | 7/2005 | Walsh et al. | |
| 2008/0008175 | A1* | 1/2008 | Park | H04H 20/30 370/390 |
| 2008/0320171 | A1 | 12/2008 | Walsh et al. | |
| 2009/0094356 | A1* | 4/2009 | Vare | H04N 21/2362 709/223 |
| 2009/0296624 | A1* | 12/2009 | Ryu | H04H 20/72 370/312 |
| 2012/0327879 | A1 | 12/2012 | Stadelmeier et al. | |

FOREIGN PATENT DOCUMENTS

| | | |
|---|---|---|
| WO | 2009/047606 | 4/2009 |
| WO | 2009/092845 | 7/2009 |

OTHER PUBLICATIONS

"Digital Video Broadcasting (DVB); Frame structure channel coding and modulation for a second generation digital terrestrial television broadcasting system (DVB-T2)", European Standard (Telecommunications Series), European Telecommunications Standards Institute (ETSI), 650, Route Des Lucioles; F-06921 Sophia-Antipolis; France, No. V1.1.1, Jul. 1, 2009.

S. Cosner et al., "Compressing IP/UDP/RTP Headers for Low-Speed Serial Links", Internet Citation, Feb. 1999, retrieved from Internet: URL:ftp://ftp.isi.edu/in-notes/rfc2508.txt [retrieved on Nov. 1, 1999].

DVB Project: "DVB TM-H NGH Call for Technologies (CfT)", Nov. 19, 2009, retrieved from Internet: URL:http://www,dvb,org/technology/dvb-ngh/ [retrieved on Aug. 4, 2010], pp. 7-17.

DVB Project: "TM-H NGH Study mission report", Jun. 6, 2008, retrieved from Internet: URL:http://www.dvb.org/technology/dvb-ngh/ DVB-NGH-Study-Mission-Report-TM-H.pdf [retrieved on Aug. 4, 2010], pp. 74-78.

M. Degermark et al., "IP Header Compression", Feb. 1999, retrieved from Internet: URL:http://www.ietf.org/rfc/rfc2507.txt [retrieved on Aug. 5, 2010].

ETSI EN 300 744 V1.6.1 (Jan. 2009), Digital European Video Broadcasting (DVB); Framing Standard (Telecommunications structure, channel coding and modulation for digital terrestrial television, European Standard (Telecommunications series).

ETSI EN 302 755 V1.1.1 (Sep. 2009), Digital Video Broadcasting (DVB); Frame structure channel coding and modulation for a second generation digital terrestrial television broadcasting system (DVB-T2); European Standard (Telecommunication series).

ETSI online, retrieved Feb. 25, 2010 from the Internet URL:http://www.esti.org.

Taiwanese Office Action dated Oct. 19, 2015 in corresponding Taiwanese Patent Application No. TW100106442 with partial English translation.

European Official Communication dated May 31, 2017 in corresponding European Application No. 11709218.9.

* cited by examiner

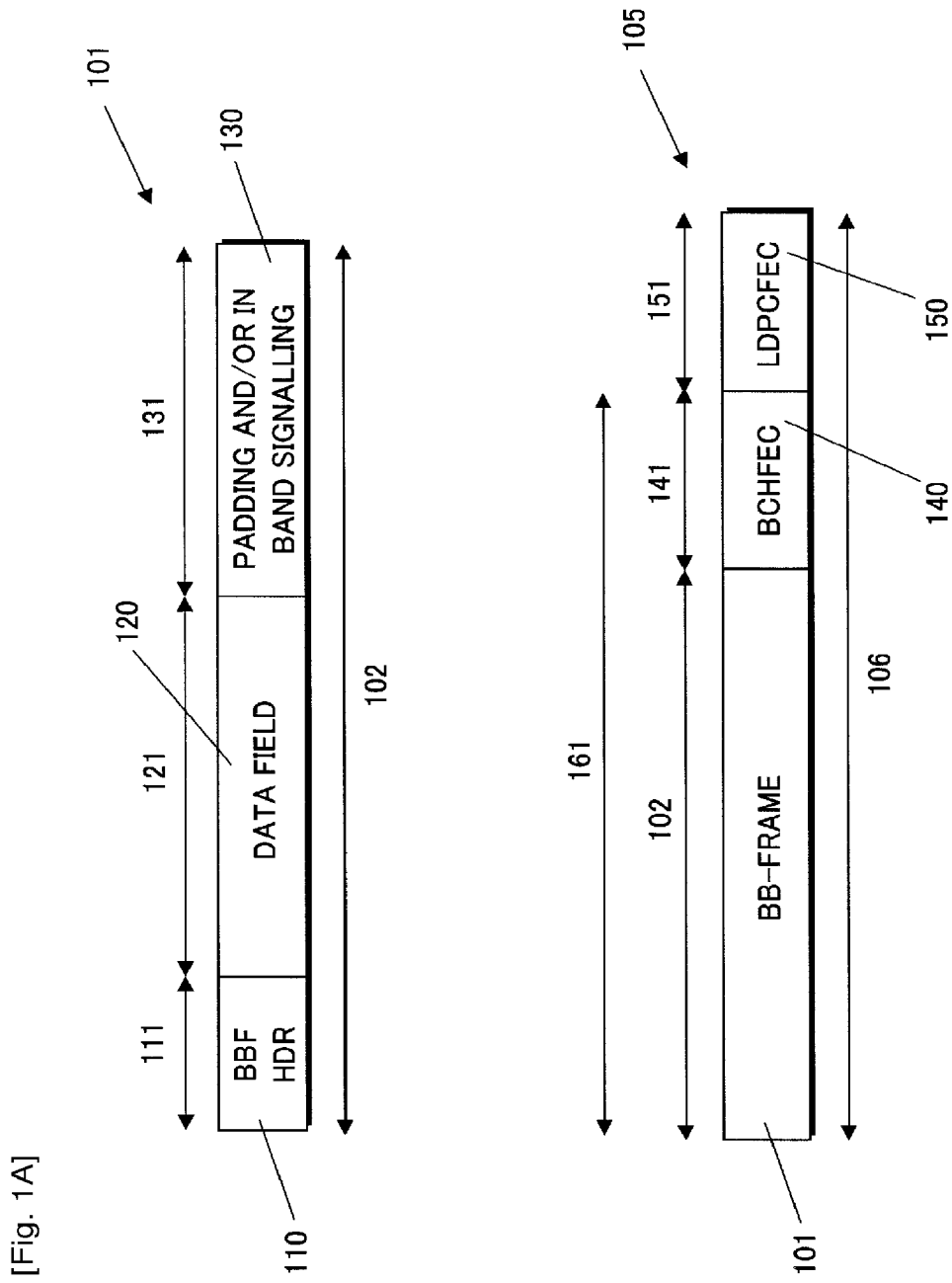

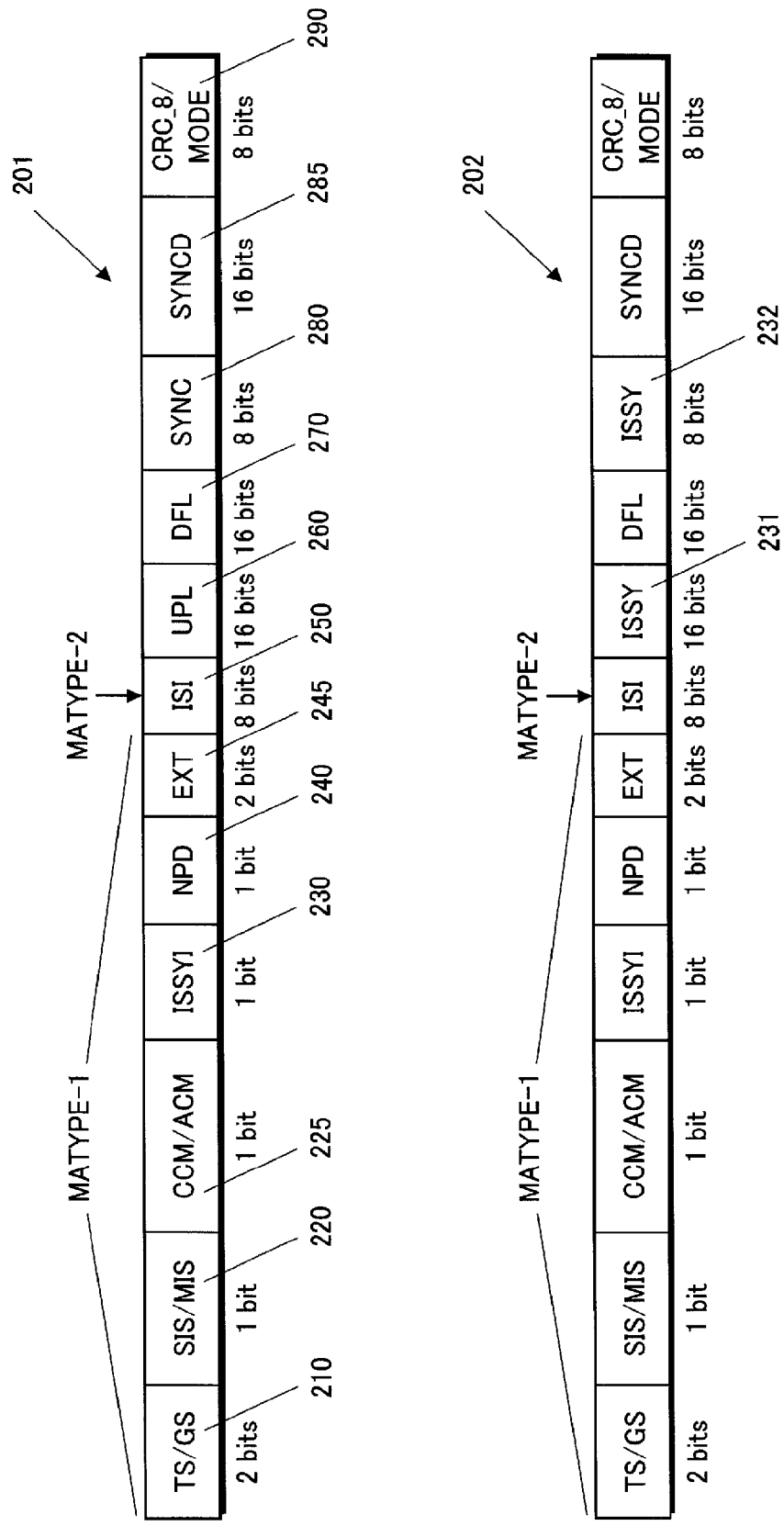
[Fig. 1B]

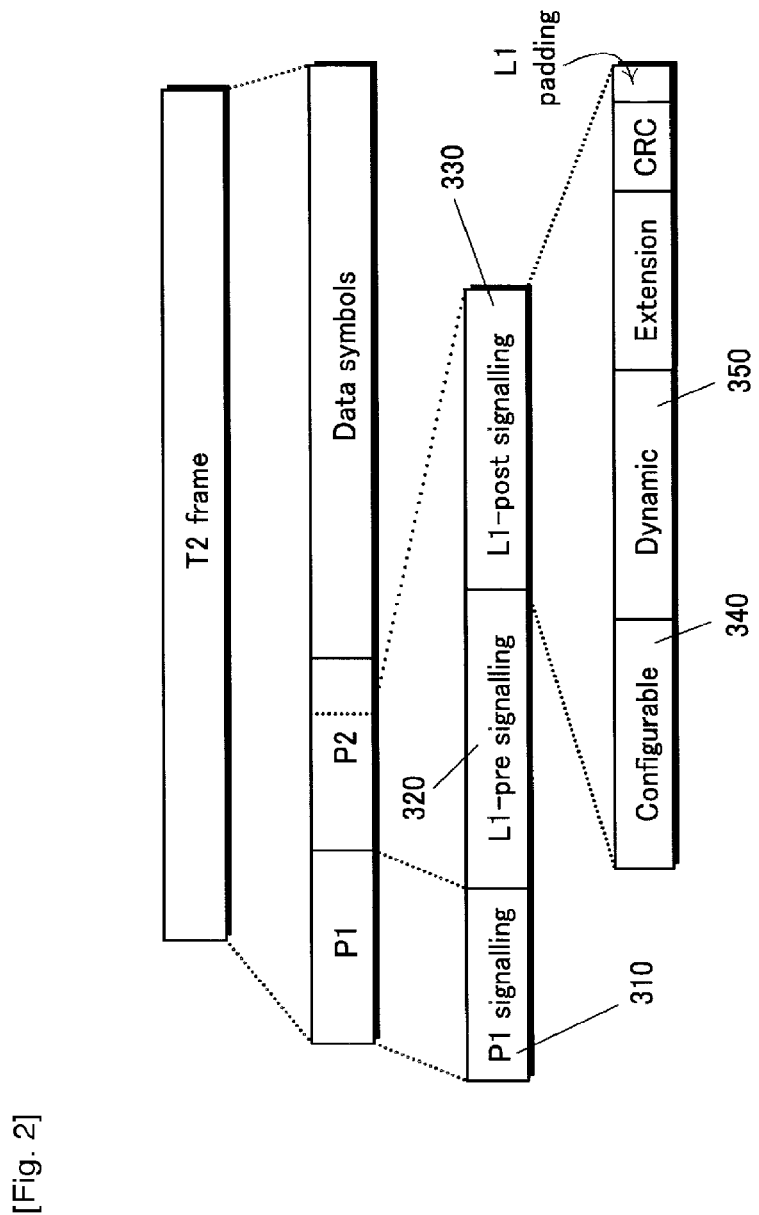

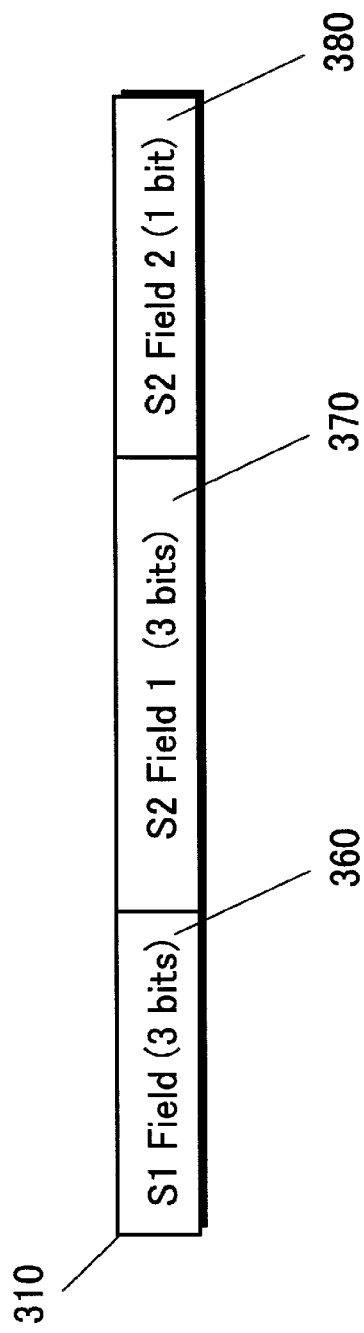

[Fig. 4]

| S1 | Preamble Format / P2 Type | Description |
|---|---|---|
| 000 | T2_SISO | The preamble is a T2 preamble and the P2 part is transmitted in its SISO format |
| 001 | T2_MISO | The preamble is a T2 preamble and the P2 part is transmitted in its MISO format |
| 010 | Non-T2 | cf. Figure 6, table 610 |
| 011 100 101 110 111 | Reserved for future use | These combinations may be used for future systems, including a system containing both T2-frames and FEF parts, as well as future systems not defined in the present document |

[Fig. 5]

| S1 | S2 | FFT/GI size | Description |
|---|---|---|---|
| 00X | 000X | FFT Size: 2K – any allowed guard interval | Indicates the FFT size and guard interval of the symbols in the T2-frame |
| 00X | 001X | FFT Size: 8K – guard intervals 1/32; 1/16; 1/8 or 1/4 | |
| 00X | 010X | FFT Size: 4K – any allowed guard interval | |
| 00X | 011X | FFT Size: 1K – any allowed guard interval | |
| 00X | 100X | FFT Size: 16K – any allowed guard interval | |
| 00X | 101X | FFT Size: 32K – guard intervals 1/32; 1/16; or 1/8 | |
| 00X | 110X | FFT Size: 8K – guard intervals 1/128; 19/256 or 19/128 | |
| 00X | 111X | FFT Size: 32K – guard intervals 1/128; 19/256 or 19/128 | |

| S1 | S2 field 1 | S2 field 2 | Meaning | Description |
|---|---|---|---|---|
| 010 | 000 | x | Undefined FEF part | The preamble is the preamble of a FEF part, but the contents of the remainder of the FEF part are not specified by the present document – it may be used in any way for professional applications and is not intended for consumer receivers |
| 010 | 001 – 111 | x | Reserved for future use | – |

620

| S1 | S2 field 1 | S2 field 2 | Meaning | Description |
|---|---|---|---|---|
| XXX | XXX | 0 | Not mixed | All preambles in the current transmission are of the same type as this preamble. |
| XXX | XXX | 1 | Mixed | Preambles of different types are transmitted |

[Fig. 7]

| L1-pre signalling | L1-post signalling |
|---|---|

| Field | Size |
|---|---|
| TYPE | (8 bits) |
| BWT_EXT | (1 bit) |
| S1 | (3 bits) |
| S2 | (4 bits) |
| L1_REPETITION_FLAG | (1 bit) |
| GUARD_INTERVAL | (3 bits) |
| PAPR | (4 bits) |
| L1_MOD | (4 bits) |
| L1_COD | (2 bits) |
| L1_FEC_TYPE | (2 bits) |
| L1_POST_SIZE | (18 bits) |
| L1_POST_INFO_SIZE | (18 bits) |
| PILOT_PATTERN | (4 bits) |
| TX_ID_AVAILABILITY | (8 bits) |
| CELL_ID | (16 bits) |
| NETWORK_ID | (16 bits) |
| T2_SYSTEM_ID | (16 bits) |
| NUM_T2_FRAMES | (8 bits) |
| NUM_DATA_SYMBOLS | (12 bits) |
| REGEN_FLAG | (3 bits) |
| L1_POST_EXTENSION | (1 bit) |
| NUM_RF | (3 bits) |
| CURRENT_RF_IDX | (3 bits) |
| T2_VERSION | (4 bits) |
| RESERVED | (6 bits) |
| CRC_32 | (32 bits) |

[Fig. 8]
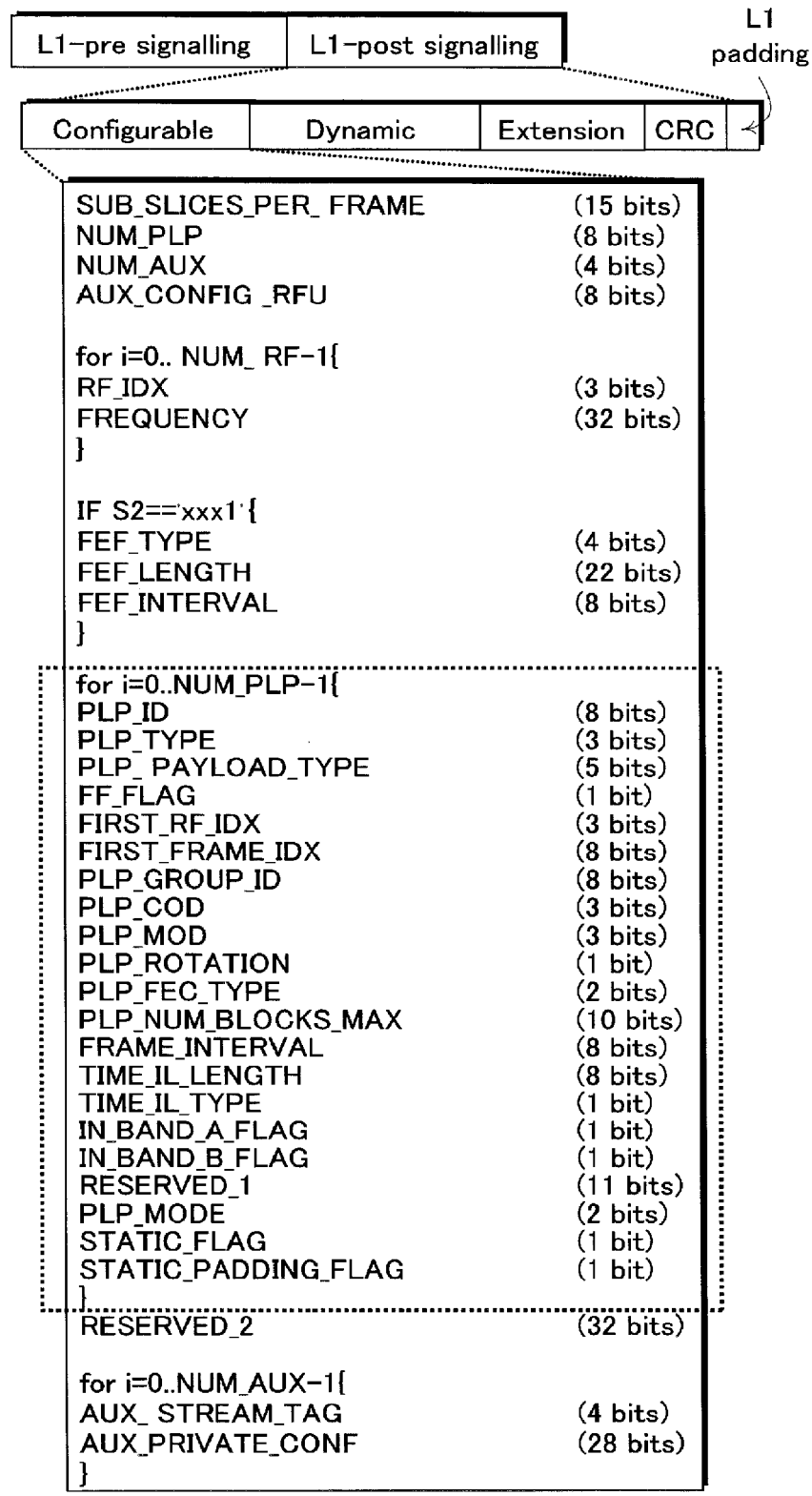

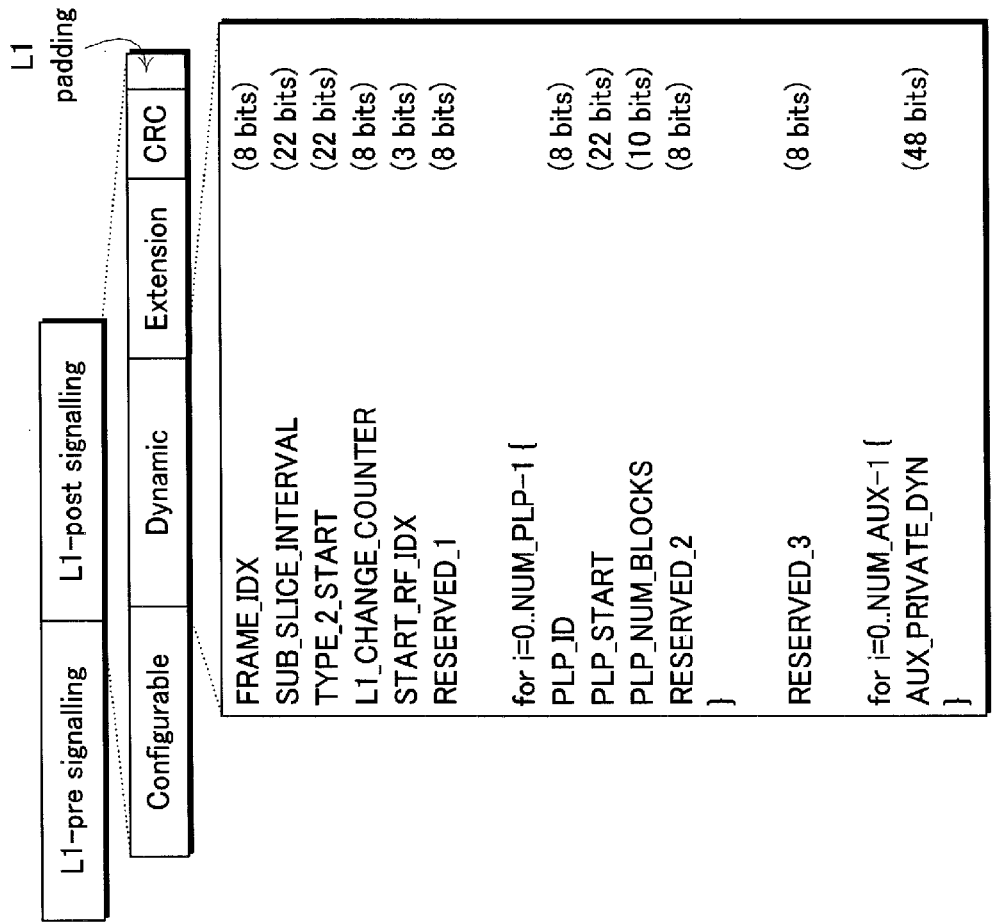
[Fig. 9]

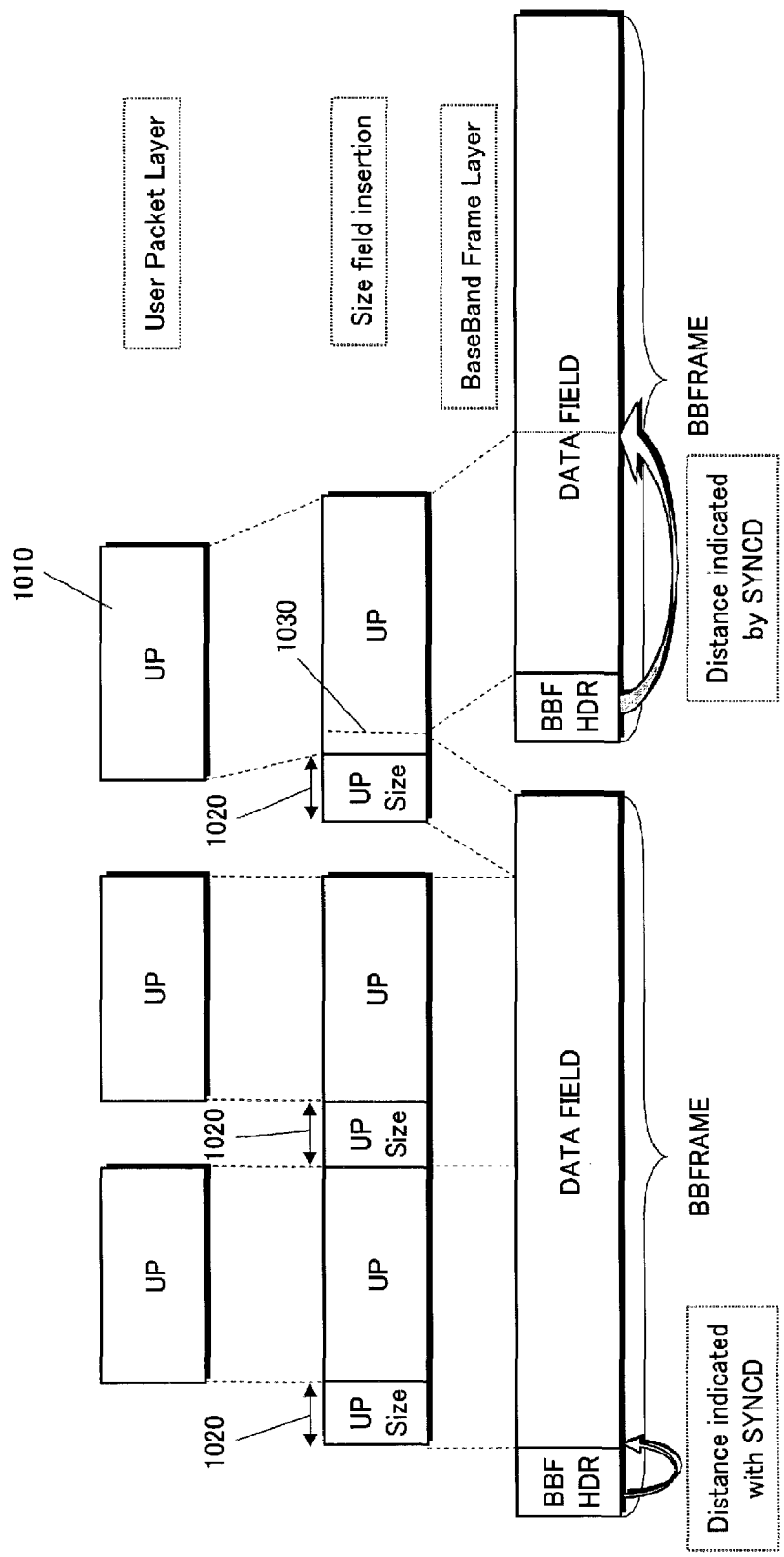
[Fig. 10]

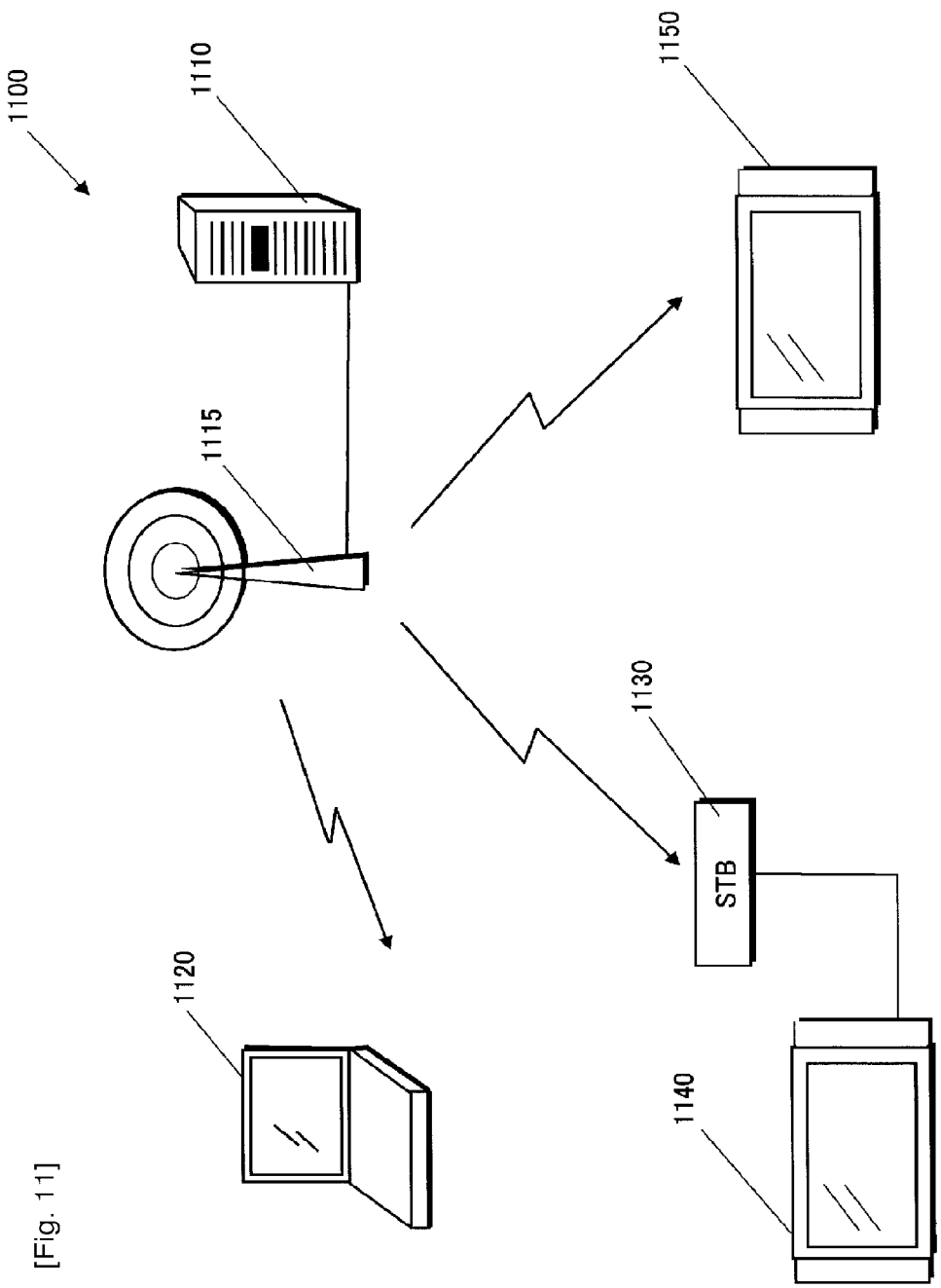
[Fig. 11]

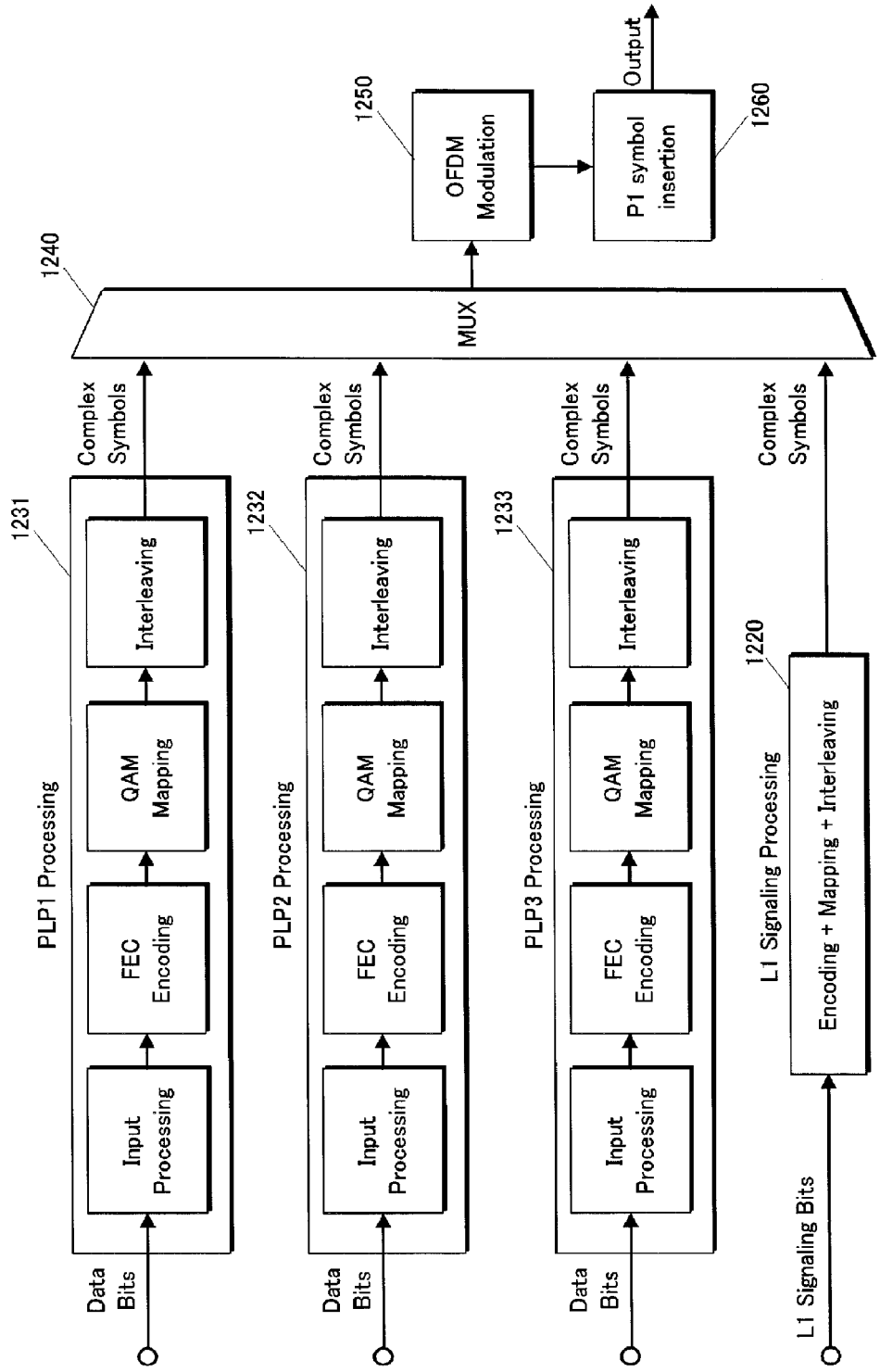
[Fig. 12]

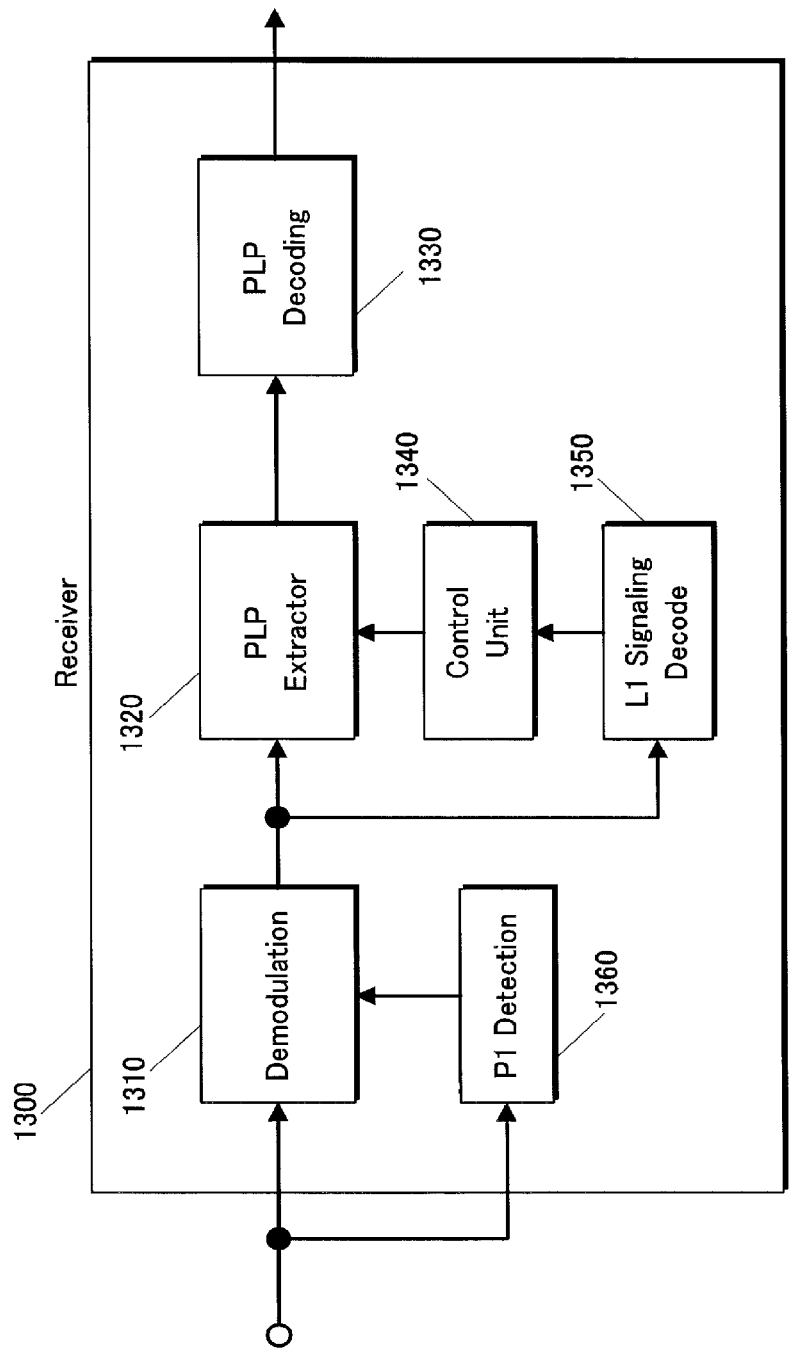
[Fig. 13]

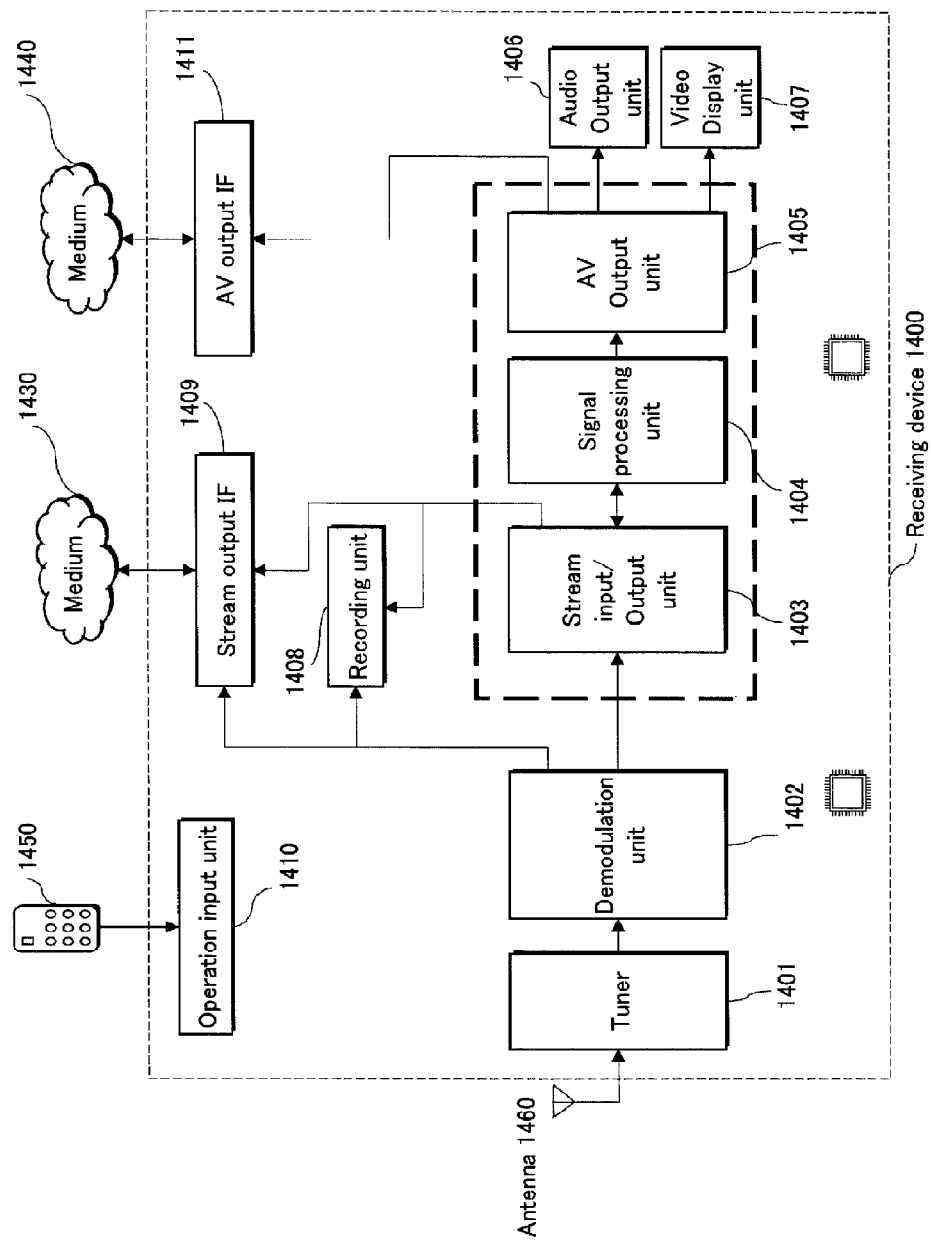

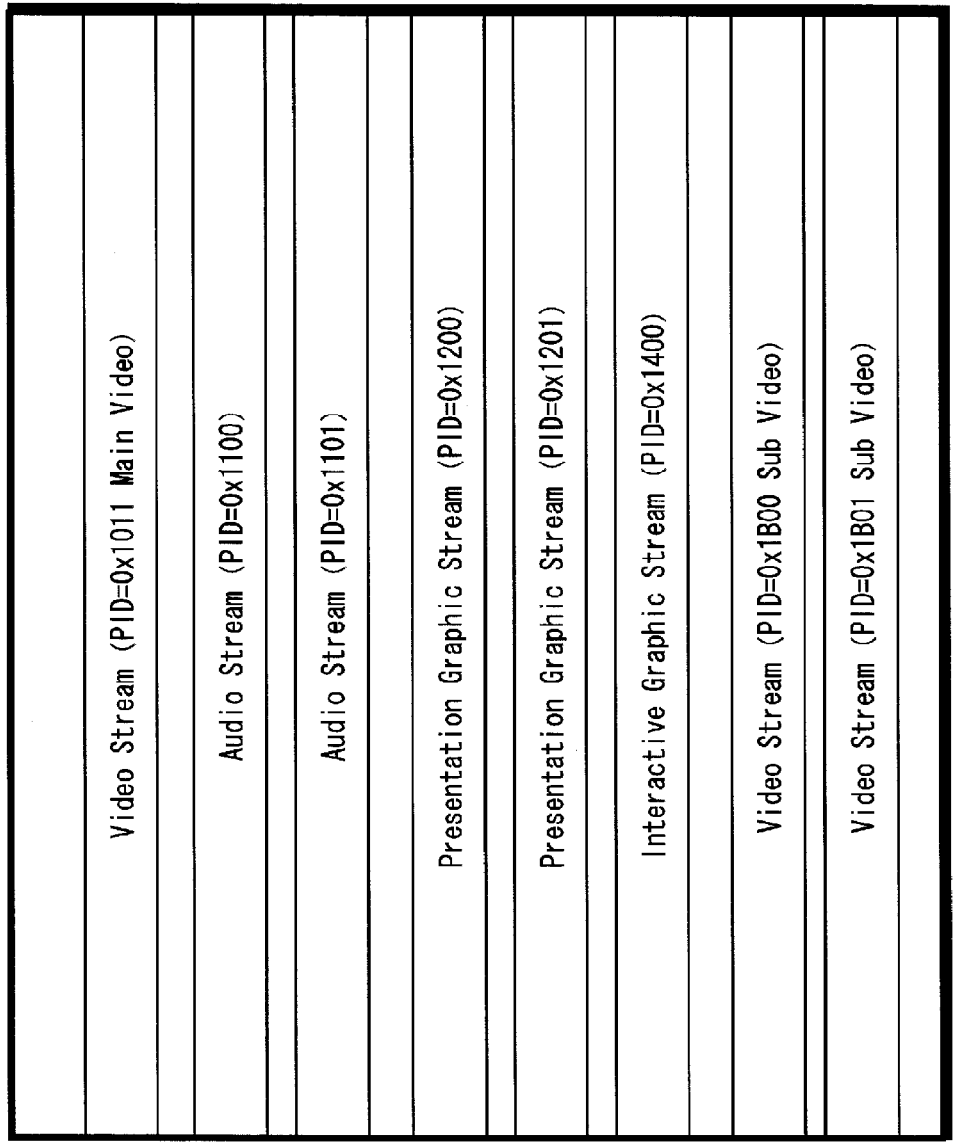
[Fig. 15]

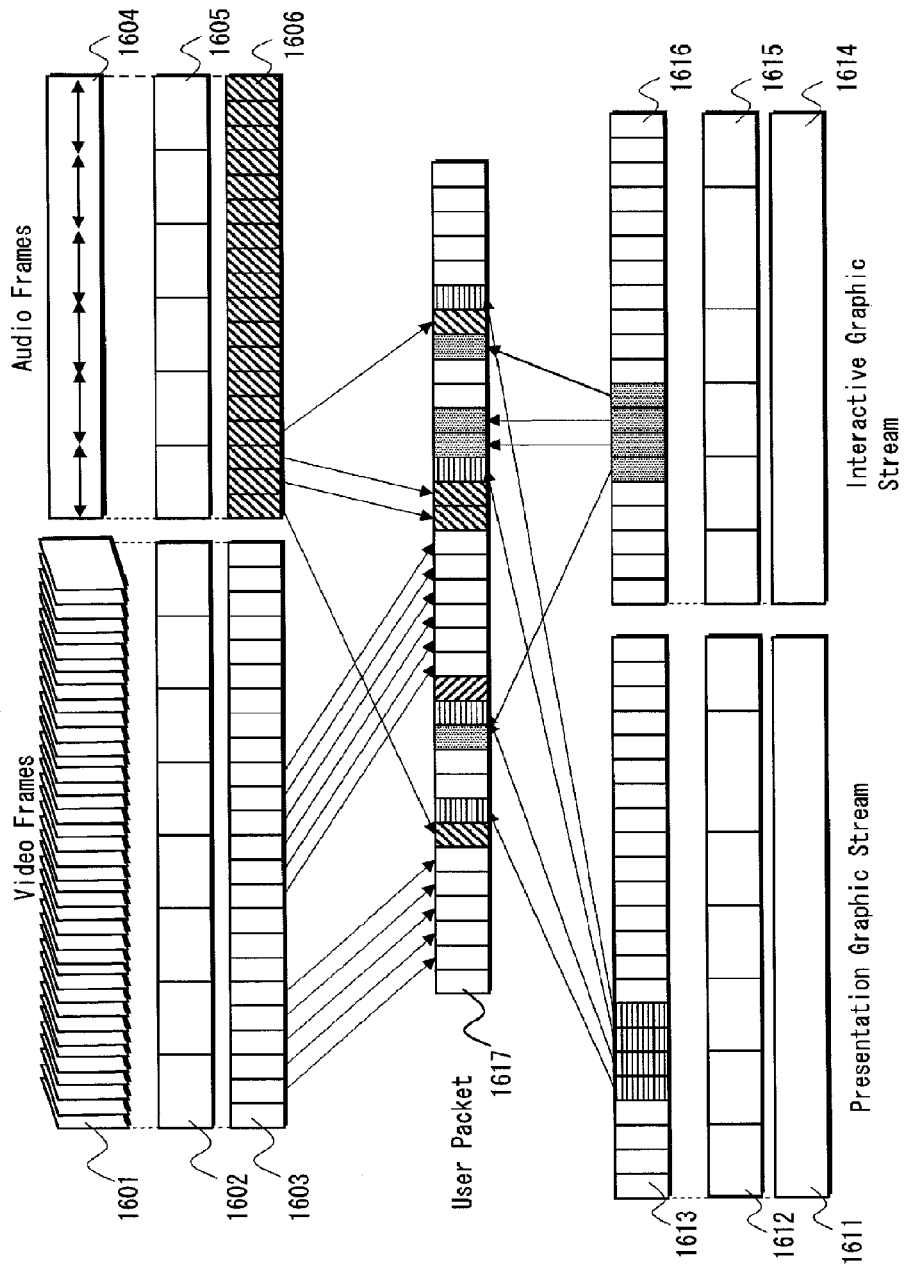

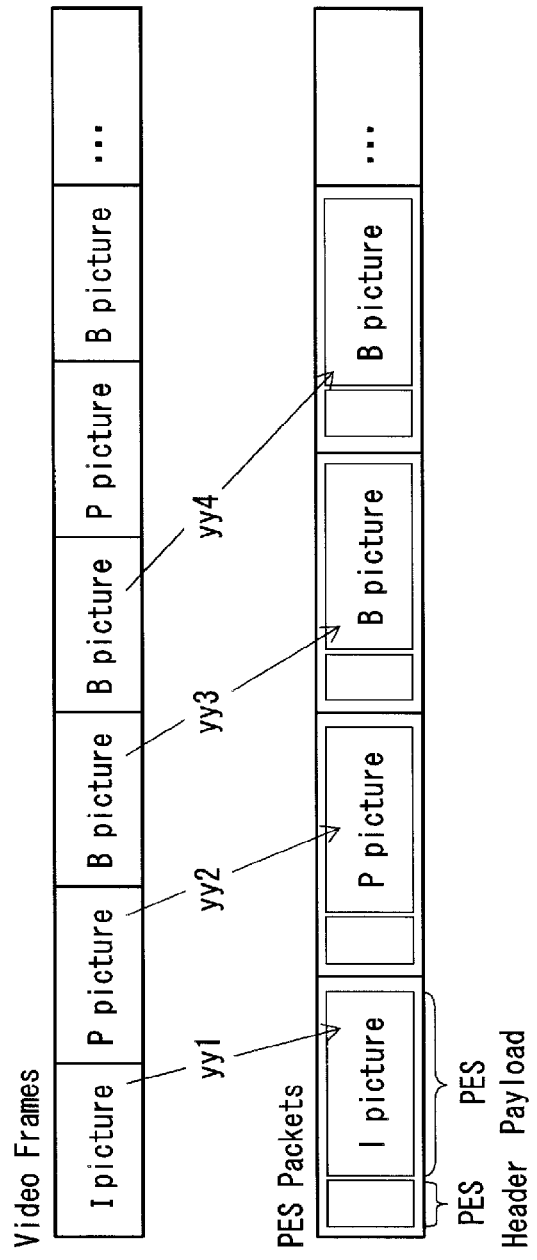

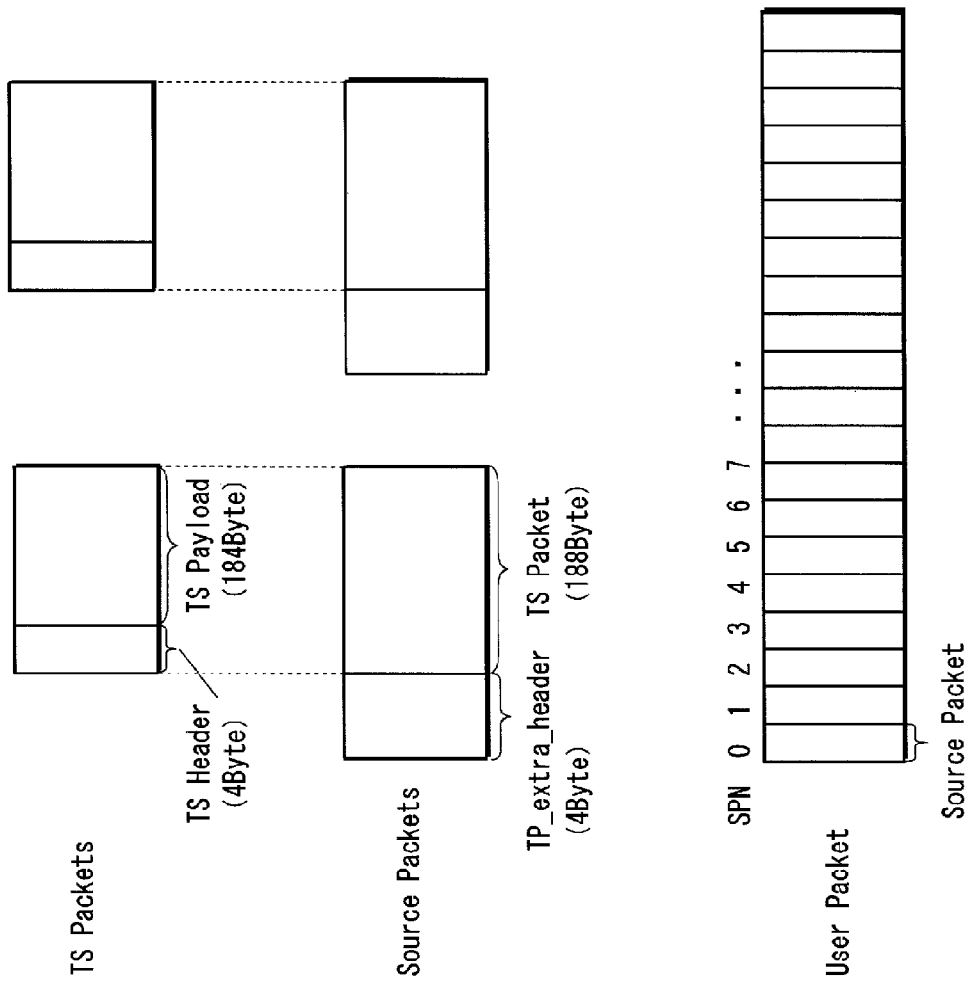

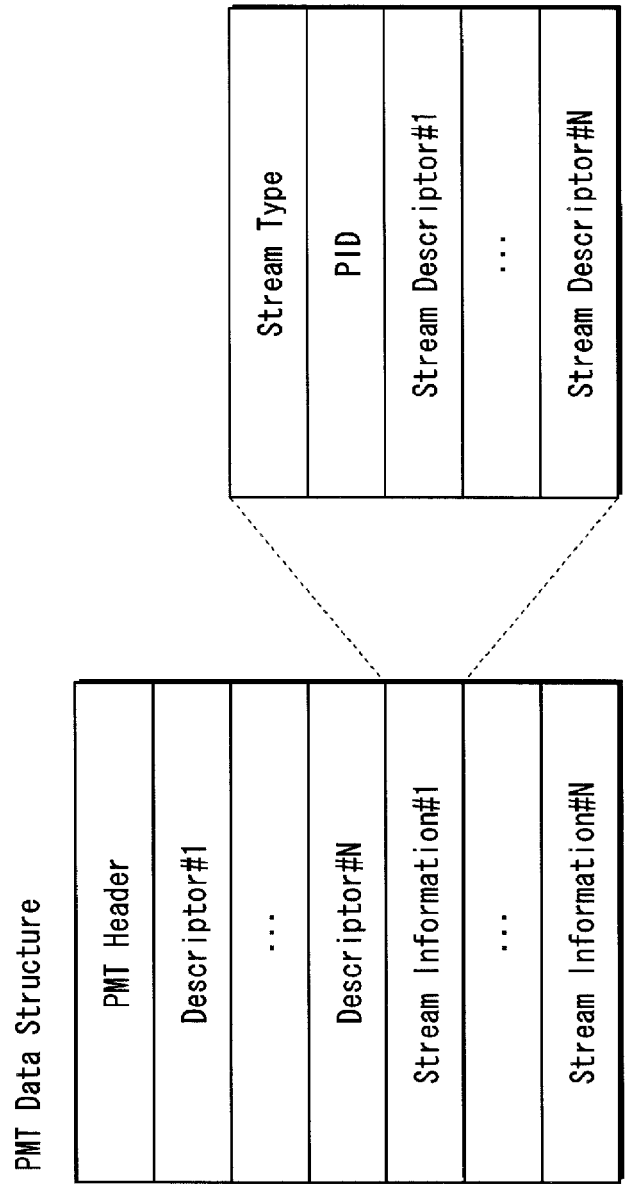
[Fig. 19]

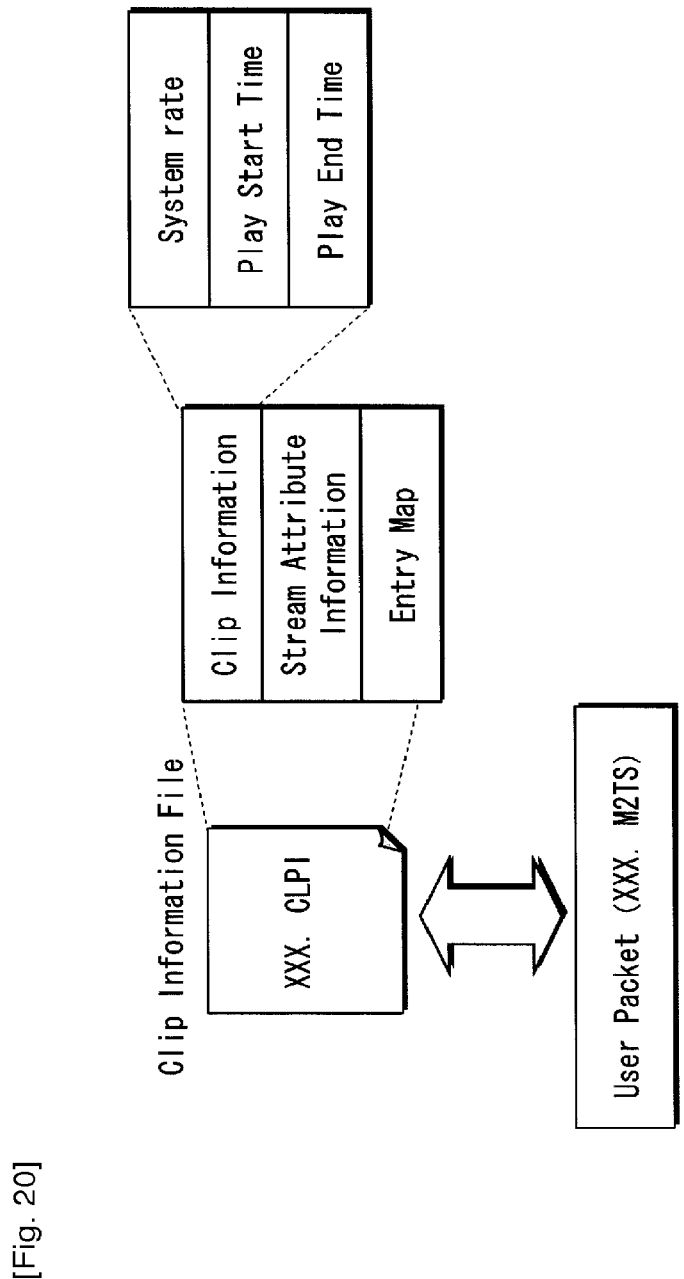
[Fig. 20]

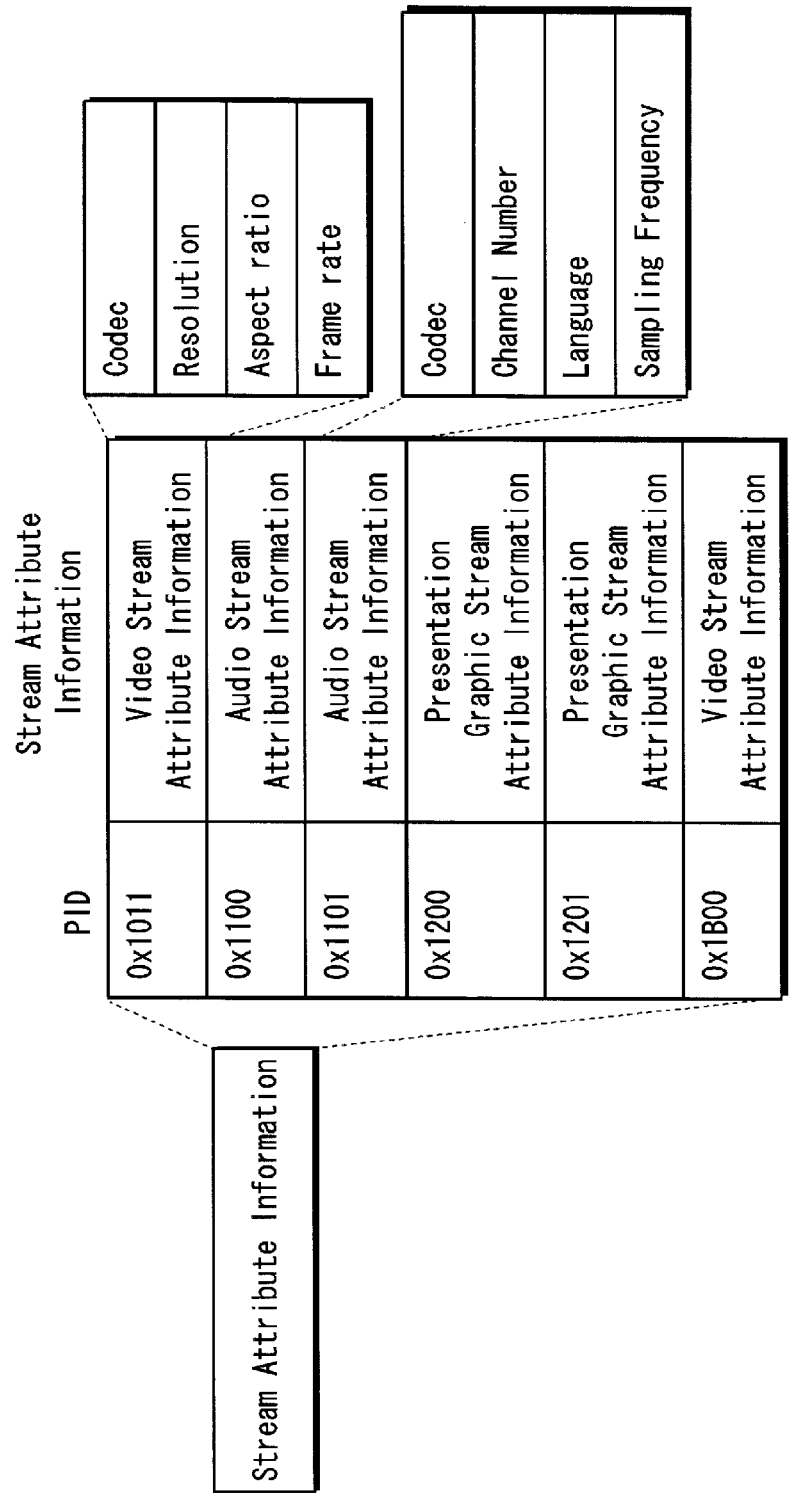
[Fig. 21]

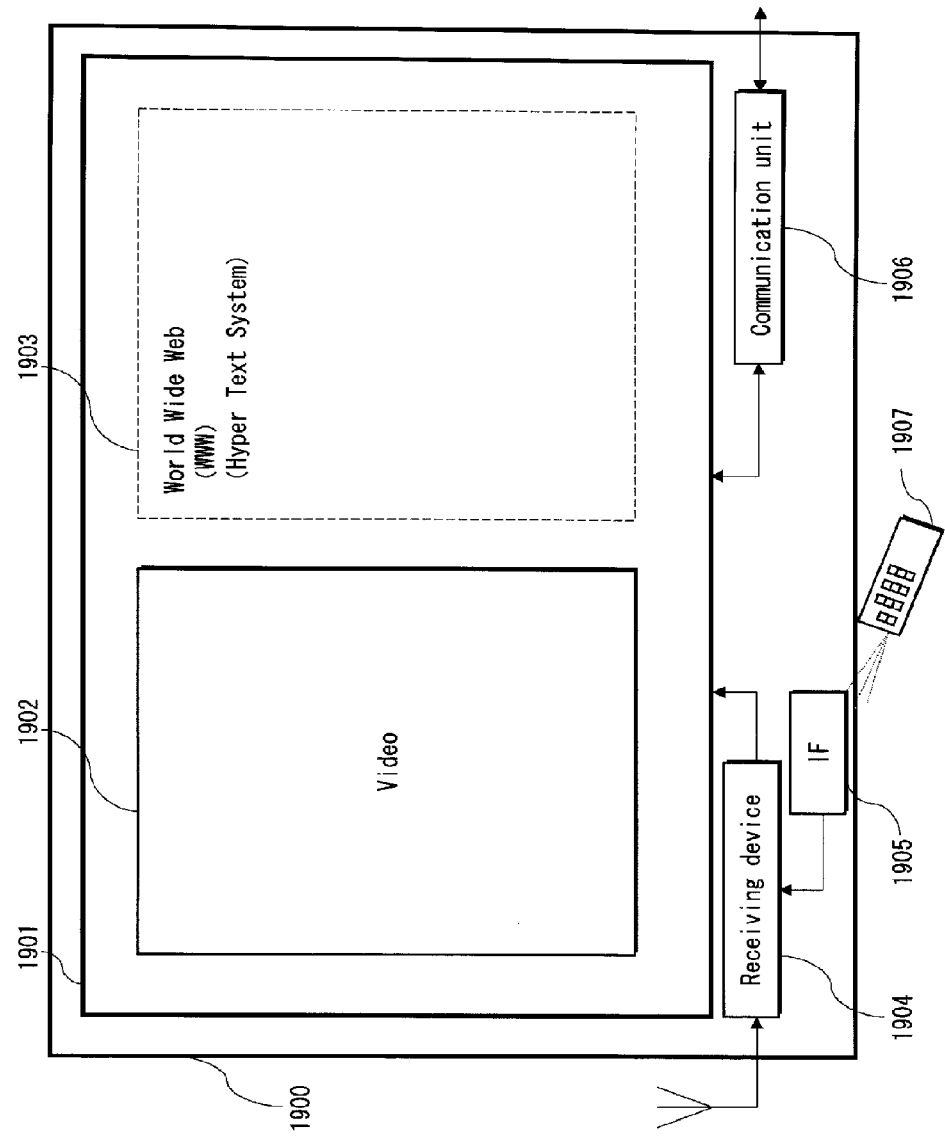
[Fig. 22]

PHYSICAL LAYER SIGNALLING FOR DIGITAL BROADCAST SYSTEM

TECHNICAL FIELD

The present invention relates to signalling in a digital broadcast network. In particular, the present invention relates to physical layer signalling.

BACKGROUND ART

Digital broadcast networks enable the unidirectional transmission of data such as audio, video, subtitling text, applications, etc. In broadcast networks, there is typically no return channel from the receiver to the transmitter and thus adaptive techniques cannot be employed. At present, there are several families of digital broadcast standards around the world. For instance, in Europe, Digital Video Broadcasting (DVB) standards have been adopted. In general, these standards define the physical layer and the data link layer of the broadcast distribution system. The definitions of the physical and data link layers depend on the transport medium, which can be for instance satellite transmission, cable transmission, or terrestrial transmission. Correspondingly, the family of DVB standards includes DVB-S and DVB-S2 for satellite transmission, DVB-C and DVB-C2 for cable transmission, DVB-T and DVB-T2 for terrestrial transmission, and DVB-H for terrestrial transmission to handheld devices.

The recent terrestrial digital broadcast standard DVB-T2 is a successor version of the widely used DVB-T standard in the same way as DVB-S2 and DVB-C2 are the second generation replacements of the first generation counterparts DVB-S and DVB-C. The specifications of the two standards for terrestrial broadcasting can be found in Non Patent Literature (NPL) 1 and Non Patent Literature (NPL) 2, respectively. Further details and remaining DVB specifications can be found in Non Patent Literature (NPL) 3. Other than the DVB-T standard, the DVB-T2 standard introduces, for instance, the concept of physical layer pipes (PLP), provides new forward error correction (FEC) schemes, modulation constellations, larger Orthogonal Frequency Division Multiplexing (OFDM) symbol sizes and more pilot configurations.

The concept of physical layer pipes allows multiple parallel data streams to be multiplexed at the physical layer. The processing for the multiple parallel data streams may be configured separately for each individual physical layer pipe by means of selecting, for example, a forward error correction (FEC) coding rate, modulation constellation size, interleaving length and other physical layer parameters. The separate configurability of the physical layer pipes enables the provision of different robustness levels for each individual physical layer pipe. In digital broadcasting systems that use physical layer pipes, each service (program) can be transmitted in its own physical layer pipe. This enables reducing the amount of data that must be demodulated at the receiver when assuming that only one service is consumed at a time, since the receiver only needs to demodulate the data carried in the corresponding single physical layer pipe. The physical layer pipe processing includes input processing, a forward error correction (FEC) encoding, constellation mapping, and interleaving. Within the input processing, the user packets (stemming from Transport Streams, Generic Streams, IP streams etc.) are transformed into an appropriately formatted bitstream which is then encoded and mapped on the physical layer resources. The input processing transforms user packets into baseband frames. The term "user packets" used for this invention covers also the case of continuous streams where no packet boundaries existed or are indicated.

The basic data structure at the physical layer is known as a baseband frame. The input stream of digital broadcast data is encapsulated into baseband frames. By applying forward error correction (FEC) to those baseband frames, FEC frames are formed. Baseband frames have a length which depends on the applied coding rate of the FEC coding. Baseband frames together with the parity bits build FEC frames of fixed length, for instance, of 16,200 or 64,800 bits.

FIG. 1A illustrates the format of a baseband frame 101 with length 102 of bits. The baseband frame 101 comprises a baseband frame header (BBFHDR) 110 of length 111 (80 bits in DVB-S2, DVB-T2 and DVB-C2), a data field 120 with a data field length 121, and a padding and/or in-band signalling field 130 with length 131. The length 121 of the data field is signalled within the baseband frame header 110. Signalling of the data field length (DFL) indicator 270 is necessary in order to distinguish between the data (payload) 120 transported in the baseband frame 101 and the padding and/or in-band signalling field 130, which may be carried within the same baseband frame 101. The length 102 of the baseband frame 101 corresponds to the number of bits $K_{bch}$ to which the BCH code is applied. The padding and/or in-band signalling field 130 has a length of $(K_{bch}-DFL-80)$ bits, wherein the 80 bits correspond to the length 111 of the baseband frame header.

Baseband frames carry the user content data and the meta-data belonging to a particular physical layer pipe of the broadcasting system. The baseband frames encapsulate arbitrary user packets, such as packets carrying data coded with a compression standard such as Moving Picture Experts Groups (MPEG-2) or MPEG-4 part 10 (H.264). Moreover, the baseband frames also carry meta-data related to the content carried in the same baseband frame. In other words, baseband frames are the outer content encapsulation entity to which the energy dispersal scrambling as well as physical layer error correction coding is applied. A sequence of the baseband frames builds the content of a physical layer pipe within the broadcasting system.

A forward error correction (FEC) frame 105 is illustrated in FIG. 1B. The forward error correction frame 105 has a length 106 of $N_{ldpc}$ bits, and includes a baseband frame 101 with length 102 of $K_{bch}$ bits, a field 140 with a length 141 for BCH code parity bits, and a field 150 with a length 151 for parity bits of the Low Density Parity Check (LDPC) code. In the above notation, the subscript ("ldpc" or "bch") denotes the error correction method applied, N denotes the length of data in bits after applying the method in subscript, and K denotes the length of data in bits to which the subscript method is to be applied. Accordingly, the length 141 of the BCH parity bit field 140 corresponds to $(N_{bch}-K_{bch})$ bits. The baseband frame 101 together with the BCH parity bit field 140 have a length 161 of $K_{ldpc}$ bits to which the LDPC code is applied which corresponds to $N_{bch}$ bits of the BCH-encoded data. The length 151 of the LDPC parity bit field 150 thus corresponds to $(N_{ldpc}-K_{ldpc})$ bits.

FIG. 1B further illustrates a baseband frame header 201 of a normal mode and a baseband frame header 202 of a high efficiency mode defined in the DVB-T2 and -C2 specifications. DVB-S2 uses only one baseband frame format that is identical to the normal mode format in -T2 and -C2 apart from the mode indication that is EXORed with the CRC-8 field in the C2 and T2 cases. The baseband frame header 201, 202 includes:

TS/GS indicator 210, being an input stream format indicator indicating the format of the input stream transported by the baseband frame. The length of the TS/GS indicator is two bits for distinguishing the following input stream formats: a generic fixed-length packetized stream (GFPS), a transport stream (TS), a generic continual stream (GCS), and a generic stream encapsulation (GSE).

SIS/MIS indicator 220 of one-bit length for indicating whether a single input stream (STS) or multiple input streams (MTS) are carried within the broadcast signal.

CCM/ACM indicator 225 of one-bit length for indicating whether constant coding and modulation (CCM) or adaptive coding and modulation (ACM) is applied. If constant coding and modulation is applied, all physical layer pipes use the same coding and modulation scheme. On the other side, if variable coding and modulation is applied, then in each physical layer pipe the modulation and coding scheme may be configured and it then remains constant during transmission. It may be statically reconfigured.

ISSYI, input stream synchronization indicator 230 of a one-bit length for indicating whether input stream synchronisation is active, i.e. whether an ISSY (input stream synchronization) field shall be computed and inserted into the baseband frame header (high efficiency mode, 231/232) or attached to each user packet (normal mode, with known packet boundaries).

NPD indicator 240, null packet deletion indicator of one-bit length for indicating whether the null packet deletion is activated or not. If null packet deletion is activated, then the number of deleted null packets is computed and appended after the user packets in a field of eight bits.

EXT field 245 is media specific, in DVB-T2 it is set to zero and reserved for future use.

ISI, an input stream identifier 250 having a length of one byte. This field of header is denoted as MATYPE-2. It is used if the SIS/MIS indicator 220 is set to one, i.e., to a multiple input stream (MIS). It is reserved for future use if the SIS/MIS indicator 220 is set to zero, i.e. indicates a single input stream.

UPL, user packet length indicator 260, having a length of 16 bits and indicating a user packet length in bits. UPL is not present in the high-efficiency mode.

DFL, data field length indicator 270 of 16-bit length for indicating the data field length 121 in bits of the baseband frame.

SYNC, synchronization sequence indicator 280 of eight bits, not present in the high-efficiency mode. It is not used in generic continuous stream mode and copies a user packet synchronisation byte otherwise.

SYNCD indicator 285 of 16 bits for indicating a distance in bits from the beginning of the data field 120 to the first user packet in the data field.

CRC-8/MODE indicator 290 of eight-bit length for carrying error detection parity bits for the baseband frame header and for indicating the BBF mode, i.e. either high efficiency or normal mode.

The first byte of the baseband frame header 201, 202, including TS/GS (two bits), SIS/MIS (one bit), CCM/ACM (one bit), ISSYI (one bit), NPD (one bit) and EXT (two bits) fields, is typically denoted as MATYPE-1 byte.

In the high-efficiency mode, the baseband frame header 202 differs from the baseband frame header 201 in the normal mode in that it does not carry the UPL indicator 260 and the SYNC indicator 280. Instead, the baseband frame header 202 can carry an ISSY 231, 232 (input stream synchronization) of 24 bits in the fields corresponding to the UPL indicator 260 and the SYNC indicator 280. In the normal mode, the field of ISSY 232 is appended to user packets for packetized streams. In the high efficiency mode, ISSY is transmitted per baseband frame in the baseband frame header, since the user packets of a baseband frame travel together and therefore experience the same delay/jitter. The high efficiency mode in the DVB-T2 standard can thus be seen as a first attempt towards a more efficient transport of user packets by moving particular parameters from the user packet headers to the baseband frame headers.

FIG. 2 shows the composition of a T2 frame. FIG. 3 shows a P1 symbol of the layer 1 signalling being part of DVB-T2. The complete L1 signalling being part of the T2 frame is also illustrated with FIG. 2. It consists of three elements:

P1 signalling 310 (layer 1 signalling in pre-amble symbol 1 (P1));

L1 pre-signalling 320; and

L1 post-signalling 330 (including a configurable part 340 and a dynamic part 350).

A detailed description of the physical layer parameters and frame structure can be found in clause 7 of NPL 1, which is incorporated herein by reference.

In particular, FIG. 4 shows parameters of the S1 field 360.

FIGS. 5 and 6 show parameters of the S2 fields 1 (370 in FIG. 3) and 2 (380 in FIG. 3), respectively.

FIGS. 7, 8 and 9 show the L1 pre-signalling 320, the configurable part 340 of the L1 post-signalling 330, and the dynamic part 350 of the L2 post-signalling 330, respectively. As can be seen from FIG. 8, a number of PLP related attributes is signalled with the L1 post-configurable part (cf. PLP loop starting with "for i=0 . . . NUM_PLP-1" in FIG. 8).

CITATION LIST

Non Patent Literature

NPL 1: ETSI standard EN 302 755, "Frame Structure Channel Coding and Modulation for a Second Generation Digital Terrestrial Television Broadcasting System (DVB-T2)"

NPL 2: ETSI standard ETS 300 744, "Digital Broadcasting Systems for Television, Sound and Data Services: Frame Instructor, Channel Coding and Modulation for Digital Terrestrial Television" [NPL 3] ETSI online, retrieved Feb. 25, 2010, from the Internet URL: http://www.esti.org

SUMMARY OF INVENTION

Technical Problem

However, especially in view of the emerging system DVB-NGH and other enhancements of the existing digital broadcast standards, the physical layer signalling does not provide enough flexibility and information for supporting new advantageous features and settings. Moreover, a part of the attributes related to physical layer pipes is signalled in a duplicated way in L1 post-signalling and in the headers of the baseband frames that are used to transport user packets through the physical layer pipes offered by the broadcasting system. Furthermore, there is information related to entire physical layer pipe which is transported only in the aforementioned baseband frame headers.

In view of the above mentioned problems, the present invention provides a transmitter that can perform transmission by using efficient and flexible signalling. The transmitter covers a T2-only transmission, a transmission that mixes T2 and a new broadcasting system like DVB-NGH/DVB-H2, and a new broadcasting system transmission only (for example DVB-NGH/DVB-H2). For all these cases also transmission frames of an unknown future transmission system should be allowed as it was the case for DVB-T2.

Solution to Problem

The aim of the present invention is to improve the efficiency of the digital broadcast system by providing an efficient physical layer signalling which supports features leading to more flexibility, robustness and/or more efficient encapsulation of the input stream.

This is achieved by the features as set forth in the independent claims. Preferred embodiments of the present invention form the subject matter of the dependent claims.

It is the particular approach of the present invention to provide on a per physical layer pipe basis a type indicator for indicating a format of the input stream by permitting specification of at least transport stream, generic stream and IP stream, wherein it is further signalled if a header or content compression takes place for the user packets or the complete stream of the given format and of the given physical layer pipe.

In accordance with an aspect of the present invention, a method for transmitting, in a digital broadcast network supporting a configuration of a plurality of physical layer pipes, user packets of an input stream over a physical layer pipe, is provided. The method comprises transmitting the user packets of the input stream mapped onto the physical layer pipe in accordance with a format of the input stream. The method further comprises signalling within the physical layer signalling for said physical layer pipe a type indicator indicating said format of the input stream. The method further comprises signalling within said type indicator whether the header of user packets of said input stream is compressed or not.

According with another aspect of the present invention, a method is provided for receiving in a digital broadcast network supporting a configuration of a plurality of physical layer pipes, user packets of an input stream over a physical layer pipe. The method comprises determining from the physical layer signalling for said physical layer pipe a type indicator indicating said format of the input stream. The method further includes determining from said type indicator whether the header of user packets of said input stream is compressed or not, and receiving the user packets of the input stream by demapping them from said physical layer pipe in accordance with the format of the input stream and with the indication whether the header of user packets of said input stream is compressed or not.

In accordance with an embodiment of the present invention, the type indicator is further capable of indicating at least that the input stream is a transport stream, a generic stream, and an IP stream.

In accordance with an embodiment of the present invention, the signalling whether the header of user packets of said input stream is compressed or not is performed by including within the physical layer signalling for said physical layer pipe a compression type indicator which further indicates a compression method applied for header compression of the input stream user packets. The compression method may be, for instance the ROHC (robust header compression) as employed typically for IP streams, or it may be a method for transport stream packet header compression, or any alternative header compression methods. Moreover, the presence of the compression type indicator within the signalling may be conditioned on a particular value of the type indicator. For certain formats of the input stream, no header compression may be available. Alternatively, the possible header compression methods addressed by the compression type indicator may differ for different values of the type indicator.

Alternatively, the type indicator may take values indicating at least one of transport stream, transport stream with a compressed header and/or content, IP stream, IP stream with a compressed header, UDP stream, UDP stream with a compressed header, RTP stream, and RTP stream with a compressed header. In this case, the type indicator also includes the information whether said input stream is compressed or contains packets the header or content of which is compressed or not.

In accordance with another embodiment of the present invention, the physical layer signalling further includes a global type indicator, common for all configured physical layer pipes and determined based on the type indicator of the all configured physical layer pipes, and indicating a format of the input streams as at least one of IP stream only, IP stream and transport stream, IP stream and generic stream, IP stream and transport stream and generic stream.

According to an embodiment of the present invention, the digital broadcast system is a system based on DVB, and a user packet size indicator is signalled for indicating at least that the user packets of the physical layer pipe has a variable length, wherein a length of a user packet is signalled within the baseband frame payload in front of the user packet. An indicator for indicating the location and format of the user packet indicator may be included on the layer 1 signalling as well.

In accordance with still another embodiment the physical layer signalling further includes a transmission type indicator indicating at least one of terrestrial transmission only, satellite transmission only, hybrid transmission of OFDM based both terrestrial and satellite transmission, and hybrid transmission of OFDM terrestrial and single carrier satellite transmission. This parameter may also be signalled independently of the presence of signalling for the type indicator and/or the indication related to the header compression.

Advantageously, the digital broadcast network is a network based on the DVB-T2, -C2 or -S2 specification or their enhanced versions respectively and the type indicator parameter is signalled within physical layer post configurable signalling.

In accordance with still another embodiment of the present invention, an apparatus is provided for transmitting, in a digital broadcast network supporting a configuration of a plurality of physical layer pipes, user packets of an input stream over a physical layer pipe. The apparatus comprising a data transmitting unit for transmitting the user packets of the input stream mapped onto the physical layer pipe in accordance with a format of the input stream The apparatus further comprises a signalling transmitting unit for signalling within the physical layer signalling for said physical layer pipe a type indicator indicating said format of the input stream, the type indicator for signalling within said type indicator whether the header of user packets of said input stream is compressed or not.

In accordance with still another embodiment of the present invention an apparatus is provided for receiving, in a digital broadcast network supporting a configuration of a plurality of physical layer pipes, user packets of an input stream over a physical layer pipe. The apparatus comprises: a signalling receiving unit for determining from the physical layer signalling for said physical layer pipe a type indicator indicating said format of the input stream, and for determining from said type indicator whether the header of user packets of said input stream is compressed or not, and a data receiving unit for receiving the user packets of the input stream by demapping them from said physical layer pipe in accordance with the format of the input stream and with the indication whether the header of user packets of said input stream is compressed or not.

In accordance with another aspect of the present invention, a computer-readable recording medium having recorded thereon a computer-readable program code is provided, the program code being adapted to carry out the present invention.

Advantageous Effects of Invention

The present invention can provide a transmitter capable of performing efficient and flexible signalling.

BRIEF DESCRIPTION OF DRAWINGS

FIG. 1A is a schematic drawing illustrating the format of a baseband frame and a forward error correction frame according to a DVB-T2 specification.

FIG. 1B is a schematic drawing illustrating the format of a baseband frame header in normal mode and in high-efficiency mode.

FIG. 2 is a schematic drawing illustrating the structure of the T2 frame and the physical layer (L1) signalling being part of it according to the DVB-T2 specification.

FIG. 3 is a schematic drawing illustrating physical layer signalling according to the DVB-T2 specification, in particular, physical layer P1 signalling.

FIG. 4 is a table 410 illustrating signalling parameters of the S1 field in P1 signalling.

FIG. 5 is a table 510 illustrating signalling parameters of the S1 and S2 fields in P1 signalling.

FIG. 6 illustrate tables 610 and 620 showing combinations of signalling parameters of the S1 field, S2 field 1, and S2 field 2 in P1 signalling, and the meanings of such combinations.

FIG. 7 is a table illustrating the parameters of the L1 pre-signalling according to the DVB-T2 specification.

FIG. 8 is a table illustrating the parameters of the L1 post-configurable signalling according to the DVB-T2 specification.

FIG. 9 is a table illustrating the parameters of the L1 post-dynamic signalling according to the DVB-T2 specification.

FIG. 10 is a schematic drawing illustrating an example of user packet size field insertion into the baseband data field in accordance with an embodiment of the present invention.

FIG 11 is a block diagram illustrating a transmitter and a receiver according to an embodiment of the present invention.

FIG. 12 shows one example of a transmitter (using three physical layer pipes) according to the DVB-T2 specification, pertaining to an embodiment of the present invention.

FIG. 13 shows one example of a receiver pertaining to an embodiment of the present invention.

FIG. 14 is a schematic drawing illustrating an example of a receiving device.

FIG. 15 is a schematic drawing illustrating the structure of multiplexed data.

FIG. 16 is a schematic drawing illustrating how each stream is multiplexed.

FIG. 17 is a schematic drawing illustrating in detail how a video stream is stored in a sequence of PES packets.

FIG. 18 is a schematic drawing illustrating the format of a TS packet and a source packet present in multiplexed data.

FIG. 19 is a schematic drawing illustrating the structure of PMT data.

FIG. 20 is a schematic drawing illustrating the internal structure of multiplexed data.

FIG. 21 is a schematic drawing illustrating the internal structure of stream attribute information.

FIG. 22 is a schematic drawing illustrating an example of the structure of video display and audio output device.

DESCRIPTION OF EMBODIMENTS

The present application is based on an application No. 10002024.7 filed in the European Patent Office, the contents of which are hereby incorporated by reference.

The underlying problem of the present embodiment is based on the observation that the layer 1 signalling for new broadcasting systems such as DVB-NGH/DVB-H2 or extensions and successors of the existing standards of the DVB family or other similar standards, needs to be adjusted and extended so that it covers settings for the new broadcasting system and allows for co-existence with the existing and future systems and so that it provides in an unambiguous way all parameters that logically belong to this level of signalling.

In particular, it would be advantageous to provide support for IP (Internet Protocol) based input streams, especially to support an efficient way of their encapsulating and mapping onto the physical layer of a digital broadcast system. Moreover, the present embodiment aims at extending the flexibility and increase the efficiency of the physical layer signalling in view of new systems and features that are to be supported. The physical layer signalling should be backward compatible when possible.

The following provides specific descriptions of embodiments with reference to the drawings.

FIG. 8 shows the L1 post-signalling 330 (cf. FIG. 2). As the structure of the L1 post-signalling 330 conforms to the DVB-T2 specification, please see the DVB-T2 specification for the details thereof.

As can be seen from FIG. 8, L1 post-signalling 330 carries a part of physical layer pipe loop signalling including the parameters related to an entire physical layer pipe and configurable for each physical layer pipe separately (in FIG. 8, from "for i=0 . . . NUM_PLP-1" onward).

In order to signal the format of the user packets carried by a physical layer pipe, a type indicator parameter "PLP_PAYLOAD_TYPE" is provided. The five-bit long parameter PLP_PAYLOAD_TYPE is a variable. Depending on its value, the parameter PLP_PAYLOAD_TYPE distinguishes between the following stream formats (each value is shown in the parentheses): a generic fixed-length packetized stream GFPS (00000); a generic continual stream GCS (00001); a generic stream encapsulation GSE (00010); and a transport stream TS (00011). The remaining signalling combinations (00100 to 11111) are reserved for future use.

The parameter PLP_PAYLOAD_TYPE does not allow at present signalling of other input stream formats such as, for instance, IP, UDP, or RTP. Thus, it is not possible to map user packets of such formats (IP, UDP, or RTP) without further encapsulation into a generic stream format to the physical layer. In order to enable direct embedding of input streams with IP, UDP, and/or RTP format in the physical layer of the digital broadcast network, the present embodiment provides for a physical layer pipe a type indicator which indicates at least whether the user packets carried within the particular PLP are from a transport stream, a generic stream or an IP stream. As will be described later, this type indicator can be denoted as "PLP_PAYLOAD_TYPE", "COMPRESSION_TYPE", or the like. Such a signalling provides increased transmission efficiency since IP streams do not need to be encapsulated into a generic stream in order to be mapped onto layer 1 of the digital broadcast network.

In particular, the type indicator of the present e may correspond to the PLP_PAYLOAD_TYPE parameter in DVB-T2, DVB-C2 and their extensions or successor standards or new standards based thereon such as DVB-NGH/DVB-H2. Maintaining this parameter (PLP_PAYLOAD_TYPE) and its size (five bits) facilitates the backward compatibility. In particular, the present receivers shall ignore the newly defined signalling values while the new receivers shall utilize the enhanced input stream type signalling for accessing new types of streams. In general, multiple input streams may be transmitted in parallel, for instance, an IP stream and a TS stream. Receivers may, according to their capabilities, choose beneath those streams they are able to decode.

The present embodiment may also be applied to a corresponding parameter for signalling the global overview over all input stream formats. The type indicator may, in addition to GFPS, GCS, GSE, and TS, include values for signalling a stream of IP datagrams, UDP datagrams, RTP datagrams, or user packets in another format.

In accordance with another embodiment of the present invention, the type indicator may further distinguish between the types of input streams with or without applied header and/or content compression. For instance, the type indicator may be capable of indicating any of the following values: TS, TS with compressed headers, stream of IP datagrams, stream of UDP datagrams, stream of RTP datagrams, etc.

In accordance with another embodiment of the present invention, the presence of header compression is signalled within a separated physical layer parameter configured on a per PLP basis and included preferably within the PLP loop of L1 post-configurable signalling. Such a compression type indicator (which may be further denoted as COMPRESSION_TYPE or PLP_COMPRESSION_TYPE) indicates for a PLP whether the user packets or the unsegmented flow mapped thereon have a header and/or content compressed or not.

Still preferably, the compression type indicator further indicates the type of the header compression applied. For instance, for the IP and/or UDP and/or RTP steams a Robust Header Compression (ROHC) described in RFC 3095 may be applied, or another type of the header compression.

The compression type indicator can also indicate compression applied to only the content of the user packets. One example of content compression could be GZIP (RFC 1952). Other compression methods may be applied to the user packets and indicated by the compression type indicator.

Alternatively, the whole input stream might be compressed, i.e. content and headers (if present). An example compression scheme for this application would be ZLIB (RFC 1950).

For transport stream user packets, other types of header compression may be applied. For instance, the transport stream packet header may be compressed by not transmitting the parameter that is not needed or that may be recovered at the receiver based on signalling on other levels. The transport stream packet header is appended to a 184-byte payload and has a fixed length of 4 bytes (32 bits). This transport stream packet header includes the following fields: eight bits for a synchronisation sequence (sync), one bit for a transport error indicator, one bit for a payload unit start indicator, one bit for transport priority, thirteen bits for a packet identifier (PID), two bits for transport scrambling control, two bits for adaptation field control, and four bits for a continuity counter.

A header compression for a transport stream packet may include one or more of the following (1) through (4).

(1) Deleting the transport error indicator (one bit) since it is generated by the demodulator at the receiver and thus does not need to be transmitted.

(2) Deleting the synchronization byte (one byte, eight bits) since in digital broadcast systems, typically the borders between the user packets are indicated in another way.

(3) Replacing the continuity counter (four bits) with a shorter indicator of packet repetition (for example, a single bit indicating whether the packet is a repetition of a previous packet). Usually, for the receiver it is not important to have the same value of counter as the transmitter, it is just important that the counters increase synchronously. The continuity counter at the receiver may therefore be set arbitrarily.

(4) Replacing the PID (thirteen bits) with a shorter PID. The PID is not necessary if the mapping of transport stream packets onto the PLPs is done in such a way that only transport stream packets with one PID are mapped on a particular PLP. In such a case, the originally thirteen-bit PTD may be reduced to a one-bit indicator indicating whether a packet is a NULL packet or not. Alternatively, if transport stream packets of two or more PIDs are mapped on a PLP, each PID may be replaced by a short PID which indicates the ID of the user packets mapped on the PLP.

In view of the above, the compression type indicator (PLP_COMPRESSION_TYPE) may signal for a transport stream the application of such a header compression and/or the particular way of applying it, such as a particular combination of the transport stream packet fields that are to be deleted and/or removed and/or the length of the replacement field.

An example of including the compression type indicator PLP_COMPRESSION_TYPE into the layer 1 signalling is as follows.

$$\begin{aligned}&\text{for } i = 0 \ldots \text{NUM\_PLP-1}\{ \quad\quad\quad\quad\text{[Math. 1]}\\&\quad\text{PLP\_ID} \mathbin{/\mkern-6mu/} 8 \text{ bits}\\&\quad\text{PLP\_TYPE} \mathbin{/\mkern-6mu/} 3 \text{ bits}\\&\quad\text{PLP\_PAYLOAD\_TYPE} \mathbin{/\mkern-6mu/} 5 \text{ bits}\\&\quad\text{PLP\_COMPRESSION\_TYPE} \mathbin{/\mkern-6mu/} 2 \text{ bits}\\&\quad\ldots\\&\}\end{aligned}$$

As has been described above, it is preferable for the physical layer pipe loop in the L1 post-configurable part (cf. FIG. 8) to include the description shown in Math. 1.

This example serves only for illustration. Obviously, the compression type indicator may be included on another position, under a different name, and may have a different number of bits. The mapping of values of the PLP_COMPRESSION_TYPE indicator may depend on the value of the PLP_PAYLOAD_TYPE. For instance, if the type indicator indicates IP or UDP or RTP, the ROHC may be a possible header compression type. If the type indicator indicates TS, the transport packet header compression (TPHC) as described above, may be applicable as a header compression type, while ROHC is not necessarily included as a possibility to choose in PLP_COMPRESSION_TYPE. However, the present embodiment is not limited thereto and, in general the compression type indicator may provide a common choice of different header compression types for all possible PLP_PAYLOAD_TYPE values. Preferably, the compression type indicator has a value reserved for indicating that no header compression is applied. Alternatively, the compression type indicator may have a value indicating which one of the above-described methods (1) through (4) for performing header compression on a transport stream packet has been used.

Alternatively to fixedly including the compression type indicator into the PLP loop, the presence of the PLP_COMPRESSION_TYPE may be made dependent on the value of the PLP_PAYLOAD_TYPE. For instance, if the PLP_PAYLOAD_TYPE indicates TS or IP, the PLP_COMPRESSION_TYPE is included. If PLP_PAYLOAD_TYPE indicates GS, the PLP_COMPRESSION_TYPE is omitted.

In case of transmission of a header compressed IP or UDP or RTP stream with packets having variable lengths, signalling of the packet lengths would be required with a corresponding field attached to the related packet/datagram inside the data field of the baseband frames. Signalling of user packet lengths is necessary at the L1 PLP loop level in the case of fixed packet/datagram length, for instance as a user packet size parameter UPS. Therefore, according to the present embodiment, a user packet size ("UP Size") shall be signalled, depending on the concrete application as explained above within the payload of the baseband frames attached to the user packets. This is illustrated in FIG. 10 by way of example. In FIG. 10, user packets are mapped onto the baseband frames. In particular, a user packet 1010 is mapped onto two different baseband frames (BBF). The "UP Size" field of a predetermined length 1020 is added in front of each user packet (UP) 1010 in the payload of the BBF. The length of the "UP Size" field may be, for instance, one or two bytes. There is no necessity to include an "UP Size" field in front of a fragment of each user packet 1010, as illustrated by the example of one of the user packets 1010 where a separating line 1030 marks the separation of the user packet 1010 data into two different BBFs. The "UP Size" is signalled in front of each user packet and provides the length of said packet. Based on the SYNCD indicator within the BBF header (cf. FIG. 1) the distance between the BBF header and the start of a first complete UP that starts in the BBF data field is known.

Signalling the user packet size separately for the user packets is only necessary for the user packets with a variable size. The fact that the user packets have a variable length may be derived from the PLP_PAYLOAD_TYPE parameter, i.e., from the type indicator. However, advantageously, this may be also signalled within a User Packet Size Indicator (UPSI) signalled preferably within the L1 PLP loop signalling. The UPSI parameter for each user packet may indicate, for instance, any of the following settings (1) through (6).

(1) No length is indicated.
(2) The user packet has a fixed size (length).
(3) The user packet size is indicated in the UPS field in the PLP loop.
(4) The user packet size is indicated in the user packet or in the user packet header.
(5) The user packet size is indicated in a short (one-byte) "UP size" field inserted in front of the user packet.
(6) The user packet size is indicated in a long (two-byte) "UP size" field inserted in front of the user packet.

Note that in any of the above cases (1) through (6), the UPS is reserved for future use.

In order to increase the efficiency of the transmission, according to another embodiment of the present invention, a baseband frame header mode indicator is employed, for instance within another parameter of the PLP loop in L1 post-configurable signalling, the parameter being denoted as PLP_MODE. The baseband (BB) header mode permits indicating that a super-high efficiency mode is employed to baseband frame header.

The super-high efficiency mode enables transmitting the baseband frames with a shortened header. Indication of particular elements being part of a physical layer pipe or signalling of the mode of operation is not applicable to each baseband frame. Such information, generically applicable to the whole PLP, is more suitably located within physical layer signalling. Therefore, the super-high efficiency mode provides a short baseband frame header without at least one of an input stream format (TS/GS), a single or a multiple input stream (SIS/MIS), constant or variable coding and modulation (CCM/ACM), presence of input stream synchronization (ISSYI), presence of null packet deletion (NPD), or input steam identifier (ISI).

In order to support the super-high efficiency mode, the following parameters (1) and (2) may be shifted from signalling within the baseband frame headers to the PLP loop of the L1 post-configurable signalling part.

(1) ISSYI for Input Stream SYnchronization Indication (tells the receiver, if ISSY fields are part of the baseband frame(s) (headers) or not)
(2) NPDI for null Packet Deletion Indication (tells the receiver, whether or not the null packet deletion mechanism described for DVB-T2 is applied)

Examples of the remaining parameters include the following (3) through (6).
(3) Input stream format (TS/GS)
(4) Single or multiple input stream (SIS/MIS)
(5) Constant or variable coding and modulation (CCM/ACM)
(6) Input steam identifier (ISI)

These parameters are already present within the physical layer signalling for a physical layer pipe and therefore may be omitted without losing information. In particular, an input stream format is signalled within the parameter PLP_PAYLOAD_TYPE, the support for multiple streams may be derived from the PLP_NUM parameter indicating the number of configured PLPs, the constant or variable coding and modulation indicator may be derived from the parameter PLP_MOD indicating for a PLP the applied modulation constellation, and the input steam identifier corresponds to the PLP_ID.

In accordance with another embodiment of the present invention, a global type indicator is set at the transmitter and signalled to receivers indicating as an option also IP, UDP, and/or RTP stream. As can be seen from FIG. 7, the L1 pre-signalling includes a parameter TYPE of 8 bits. The parameter TYPE specifies the types of the input streams carried in the multiplex, i.e., within the current T2 superframe. In particular, parameter TYPE may take values indicating the following streams (1) through (3): (1) transport stream only, (2) generic stream (GSE, GFPS, GCS) but no transport stream, and (3) both TS and GS. In accordance with the present embodiment and consistently to the enhanced type indicator for a PLP, the global type indicator permits signalling of, for instance, the following entries (1) through (4): (1) IP, UDP or RTP stream only; (2) both IP and TS; (3) both IP or UDP or RTP stream and generic stream (at least one of GSE, GFPS and GCS); and (4) all TS, IP or UDP or RTP stream, and generic stream (at least one of GSE, GFPS and GCS).

According to another embodiment of the present invention, a transmission type indicator is signalled on the physical layer for indicating the media on which the digital broadcast is available. The transmission type indicator may indicate at least one of the following (1) through (4): (1) terrestrial transmission only, (2) satellite transmission only, (3) mixed terrestrial and satellite transmission wherein both are OFDM based, and (4) mixed terrestrial and satellite transmission wherein the satellite transmission is a single carrier and the terrestrial transmission is OFDM based. The transmission type indicator may be signalled, for instance, within the L1 pre-signalling 320 as a new parameter TRANSMISSION_TYPE. Signalling this parameter provides an advantage of supporting multiple transmitting media, which may be especially advantageous for mobile applications such as DVB-NGH, where the terrestrial coverage may change essentially. A receiver may, based on signalling of the transmission type indicator, select a preferred receiving medium. The receiver may decide based on the strength of received signal from the different media, based on its own capabilities, based on power supply (battery or supply network), etc. This enables the receiver to optimize the reception of the digital broadcast signal in accordance with its current conditions. The signalling of this TRANSMISSION_TYPE parameter may be performed independently of signalling of the type indicator, and/or the compression type indicator, and/or the global type indicator.

Since the P1 symbols and the related signalling have to be retained for a broadcasting system that includes, for instance, T2 and other (for example DVB-NGH/DVB-H2) transmission frames, it is required that the P1 symbols are used also for the non-T2 frames in a backwards-compatible way. Although it would be possible to deviate from this approach for the stand-alone case of the new broadcasting system (e.g. DVB-NGH/DVB-H2), it is desirable from the system design point of view not to deviate from the structure of the transmission frames of the new system in the mixed case.

In order to support transmission based on the DVB-T2 standard only and/or a mixed transmission according to DVB-T2 and DVB-NGH/DVB-H2, it is further beneficial to extend the Si field of P1 signalling (cf. FIG. 4). More specifically, a T2_MIMO parameter can be incorporated to support multiple input/multiple output (MIMO), in particular, to transmit the T2 preamble and the P2 part in an MIMO format. For the DVB-NGH system, correspondingly, the S1 field is advantageously extended to signal transmitting the NGH preamble and the P2 part in its SISO or MISO or MIMO format, corresponding to values NGH_SISO, NGH_MISO, and NGH_MIMO.

In general, the P1 symbol (cf. FIG. 2) allows the receiver to determine rapidly that a T2 and/or NGH signal has been detected, for instance during scanning of the entire frequency band. The P1 symbol is particularly robust and thus, only seven information bits may be transmitted using it (cf. FIG. 3). The Si field provides information about an associated transmission frame, namely T2_SISO, T2_MISO, . . . NGH_SISO, . . . . Based thereon, the receiver upon reception of the S1 field may already decide whether it is capable to decode at least one type of the transmission frames, for instance only T2_SISO, or other transmission frames. With providing at the same time a choice of T2 and NGH (next generation handheld) transmission frames, a mixed transmission is enabled providing the receiver with even more flexibility.

With the signalling in the following P2 symbols, the receiver may decide about its capability of decoding the entire multiplex or some particular physical layer pipes. In order to successfully decode the data in a physical layer pipe, all PLP related signalling parameters must be understood. The above described parameter TYPE relates to global features of the entire multiplex and depends on the features of the particular physical layer pipes included within the multiplex. The above added new parameter TRANSMISSION_TYPE is also a global parameter relating to the entire multiplex and provides to the receiver information which front-ends thereof may/must be used to receive the data.

For the NGH-related settings above, the S2 field 1 (three bits) shall advantageously cover the following new settings (1) through (4): (1) FFT size 2 k; (2) FFT size 8 k; (3) FFT size 4 k; and (4) FFT size 1 k. With respect to all of (1) through (4), the guard interval length has an arbitrary value. Alternatively, guard interval lengths may be set in correspondence with useful symbol periods as shown in the following examples (1) through (8): (1) FFT size 2 k, guard interval $\frac{1}{32}$ or $\frac{1}{16}$; (2) FFT size 8 k, guard interval $\frac{1}{32}$ or $\frac{1}{16}$; (3) FFT size 4 k, guard interval $\frac{1}{32}$ or $\frac{1}{16}$; (4) FFT size 1 k, guard interval $\frac{1}{16}$; (5) FFT size 2 k, guard interval $\frac{1}{8}$ or $\frac{1}{4}$; (6) FFT size 8 k, guard interval $\frac{1}{8}$, $\frac{19}{128}$ or $\frac{1}{4}$; (7) FFT size 4 k, guard interval $\frac{1}{8}$ or $\frac{1}{4}$; and (8) FFT size 1 k, guard interval $\frac{1}{8}$ or $\frac{1}{4}$. In particular, since NGH is a mobile system, advantageously, fewer guard interval configurations are supported.

Regarding the existing parameters, in view of the upcoming NGH system, the following L1 post-configurable parameters are advantageously extended:

The parameter PLP_TYPE which up to now only indicated whether a PLP is a common PLP or a data PLP of type 1 or 2, now also permits to signal that a PLP is a "signalling PLP". This allows mapping of layer 2 signalling onto a physical layer pipe.

In order to provide more robustness especially in view of the NGH system with higher mobility than the T2 systems, the signalling of the forward error correction coding rate with a parameter PLP_COD is extended to include lower coding rates of, for example, 1/4 and 1/5. This allows signalling for NGH and/or other upcoming systems coding rates, enhancing robustness and indoor coverage. Furthermore, the signalling of forward error correction type is extended to include two new sizes of FEC frames, namely PLP_FEC_TYPE of four-kbit LDPC and of one-kbit LDPC. These sizes are smaller than presently supported sizes of 64 kbit and 16 kbit in order to reduce the storage requirements of the receivers.

The above described extended and new parameters may be signaled independently of the presence of each other. Any of these parameters may be signaled within the physical layer signalling.

FIG. 11 shows an example of a digital broadcast system 1100 in which the present invention may be applied. A transmitting apparatus 1110 may implement the transport stream packet header compression of the present invention as described above. The transmitting apparatus 1110 may be a single device or a plurality of interconnected devices. The transmitting station 1115 transmits the broadcast signal formed by the transmitting apparatus 1110. In this example, a terrestrial digital broadcast system is illustrated. However, the present invention is not limited thereto and may also be applied to satellite broadcasting, cable broadcasting, or hybrid broadcasting (a combination of different transmission methods, such as terrestrial broadcasting and satellite broadcasting). The receiving apparatuses illustrated in FIG. 11 are a computer such as a portable or a personal computer 1120. It may, however, be also a handheld device or a mobile telephone capable of receiving the digital broadcast. Other example receiving apparatuses include a set top box 1130 connected to a digital or analog TV 1140, and a digital TV 1150 with an integrated broadcast receiver. These example receiving devices and other receiving devices capable of receiving digital broadcast may implement the header decompression according to the present invention as described above.

Another embodiment of the invention relates to the implementation of the above described various embodiments using hardware and software. It is recognized that the various embodiments of the invention may be implemented or performed using computing devices (processors). A computing device or processor may for example be general-purpose processors, digital signal processors (DSP), application specific integrated circuits (ASIC), field programmable gate arrays (FPGA) or other programmable logic devices, etc. The various embodiments of the invention may also be performed or embodied by a combination of these devices.

Further, the various embodiments of the invention may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc.

In the above embodiments, most of the examples have been outlined in relation to a DVB-T, DVB-C and DVB-S based digital broadcasting system, and the terminology mainly relates to the DVB terminology. However, this terminology and the description of the various embodiments with respect to DVB-T based broadcasting are not intended to limit the principles and ideas of the invention to such systems. Also the detailed explanations of the encoding and decoding in compliance with the DVB-T2, DVB-S2 and DVB-C2 standards are intended to better understand the exemplary embodiments described herein and should not be understood as limiting the invention to the described specific implementations of processes and functions in the digital broadcasting. Nevertheless, the improvements proposed herein may be readily applied in the broadcasting systems described. Furthermore, the concept of the invention may be also readily used in the enhancements of DVB-T2, DVB-S2, DVB-C2 or DVB-NGH currently discussed in standardization.

Summarizing, the present invention relates to a physical layer signalling in a digital broadcast network. In particular, for a digital broadcast network supporting a configuration with a plurality of physical layer pipes, a type indicator is signalled on a physical layer for a pipe, the type indicator indicates the format of the input stream which may specify a transport stream, a generic stream or an IP stream. In addition, per physical layer pipe application of header compression to the user packet headers of the input stream is signalled. Other physical layer parameters are advantageously provided or extended in order to increase the flexibility and efficiency of the layer 1 signalling.

<Supplementary Notes 1>

The following describes a case where the above embodiments are applied to a DVB-T2 transmission system.

FIG. 12 is a functional block diagram of a transmitting apparatus conforming to DVB-T2. The blocks shown in FIG. 12 merely represent parts of entire functional blocks of the transmitting apparatus which are related to the present invention.

The transmitting apparatus 1200 includes PLP processing units 1231 to 1233, an L1 signalling processing unit 1220, a multiplexer 1240, an OFDM modulation unit 1250, and a P1 symbol insertion unit 1260.

The L1 signalling processing unit 1220 has the function of performing signalling in the layer 1. In particular, the L1 signalling processing unit 1220 has the function of including a type indicator (e.g., PLP_PAYLOAD_TYPE and COMPRESSION_TYPE") into the aforementioned PLP loop in the L1 post-configurable part.

Each of the PLP processing units 1231 to 1233 performs the following processing (1) through (4) as shown in FIG. 12: (1) input processing; (2) forward error correction (FEC) encoding; (3) quadrature amplitude modulation (QAM) constellation mapping; and (4) interleaving.

The L1 signalling processing unit 1220 generates L1 signalling data, and performs processing including forward error correction encoding, mapping, and interleaving. In this L1 signalling processing, all pieces of information that are required to enable a receiving apparatus to decode any PLP are included into the data.

The multiplexer (MUX) 1240 multiplexes complex symbols output from the PLP processing units 1231 to 1233 and the L1 signalling processing unit 1220. The OFDM modulation unit 1250 performs OFDM modulation on the multiplexed complex symbols. As a result of the multiplexing operation, transmission frames include complex symbols that carry signalling data for a physical layer (layer 1).

After the OFDM modulation is performed, the P1 symbol insertion unit 1260 inserts P1 symbols. With this method, the transmitting apparatus can output the T2 frame shown in FIG. 2.

FIG. 13 is a functional block diagram of a receiving apparatus pertaining to an embodiment of the present invention.

An RF signal is fed to a P1 detection unit 1360 of the receiver 1300. Detected P1 symbols and RF signal are fed to a demodulation unit 1310. The demodulation unit 1310 demodulates the RF signal based on the P1 symbols detected by the P1 detection unit 1360.

The signal demodulated by the demodulation unit 1310 is fed to an L1 signalling decode unit 1350 that decodes L1 signalling information.

The L1 signalling decode unit 1350 has the function of decoding signalling information in the layer 1. In particular, the L1 signalling decode unit 1350 has the function of decoding a type indicator (e.g., PLP_PAYLOAD_TYPE and COMPRESSION_TYPE) which is included in the signalling information and also in the aforementioned PLP loop in the L1 post-configurable part.

The signal demodulated by the demodulation unit 1310 is also fed to a PLP extraction unit 1320 that extracts a PLP carrying a stream necessary to receive a desired program.

The extracted PLP is decoded by a PLP decode unit 1330.

A control unit 1340 controls the PLP extraction unit 1320 based on the signalling information indicated by the L1 signalling decode unit 1350.

<Supplementary Notes 2>

The following describes exemplary applications of the transmission and reception methods described in the above embodiments and an exemplary structure of a system suitable for the methods.

FIG. 14 is a schematic view illustrating an exemplary structure of a receiving device 1400 for carrying out the reception methods described in the above embodiments. As illustrated in FIG. 14, in one exemplary structure, the receiving device 1400 may be composed of a modem portion implemented on a single LSI (or a single chip set) and a codec portion implemented on another single LSI (or another single chip set). The receiving device 1400 illustrated in FIG. 14 is a component that is included, for example, in the TVs (television receivers) 1140 and 1150, the STB (Set Top Box) 1130, the computer, such as the personal computer 1120, handheld device, or mobile telephone, illustrated in FIG. 11. The receiving device 1400 includes an antenna 1460 for receiving a high-frequency signal, a tuner 1401 for transforming the received signal into a baseband signal, and a demodulation unit 1402 for demodulating transport streams from the baseband signal obtained by frequency conversion. The receiver 1300 described in the above embodiments corresponds to the demodulation unit 1402 and executes any of the reception methods described in the above embodiments to receive transport streams. As a consequence, the advantageous effects of the present invention described relative to the above embodiments are produced.

The following description is directed to the case where the transport streams include at least one video stream and at least one audio stream. The video stream is for transmitting data obtained by encoding, for example, a video signal with a moving picture coding method compliant with a given standard, such as MPEG2, MPEG4-Advanced Video Coding (AVC) or VC-1. The audio stream is for transmitting data obtained by encoding, for example, an audio signal with an audio coding method compliant with a given standard, such as Dolby Audio Coding (AC)-3, Dolby Digital Plus, Meridian Lossless Packing (MLP), Digital Theater Systems (DTS), DTS-HD, or Pulse Coding Modulation (PCM).

The receiving device 1400 includes a stream input/output unit 1403, a signal processing unit 1404, an audio and visual output unit (hereinafter, AV output unit) 1405, an audio output unit 1406, and a video display unit 1407. The stream input/output unit 1403 demultiplexes video and audio streams from transport streams obtained by the demodulation unit 1402. The signal processing unit 1404 decodes the demultiplexed video stream into a video signal, using an appropriate moving picture decoding method and also decodes the demultiplexed audio stream into an audio signal using an appropriate audio decoding method. The audio and visual output unit 1405 outputs a video signal and an audio signal to an audio and visual output interface (hereinafter, AV output IF) 1411. The audio output unit 1406, such as a speaker, produces audio output according to the decoded audio signal. The video display unit 1407, such as a display monitor, produces video output according to the decoded video signal. For example, the user may operate the remote control 1450 to select a channel (of a TV program or audio broadcast), so that information indicative of the selected channel is transmitted to an operation input unit 1410. In response, the receiving device 1400 demodulates, from among signals received with the antenna 1460, a signal carried on the selected channel and applies error correction, so that reception data is extracted. At the time of data reception, the receiving device 1400 receives control symbols containing information indicating a transmission method of a signal carried on the selected channel, so that the information indicative of the transmission method is obtained. With this information, the receiving device 1400 is enabled to make appropriate settings for the receiving operation, demodulation method, and error correction method to duly receive transport streams transmitted from a broadcast station (base station). Here, for example, symbols carried by P1-signaling, L1-pre signaling, and L1-post signaling described in the above embodiments correspond to the control symbols. Similarly, the FEC coding rate per PLP, the modulation constellation and related parameters contained in P1-signaling, L1-pre signaling, and L1-post signaling correspond to the information about the transmission method. Although the above description is directed to an example in which the user selects a channel using the remote control 1450, the same description applies to an example in which the userL selects a channel using a selection key provided on the receiving device 1400.

With the above structure, the user can view a broadcast program that the receiving device 1400 receives by the reception methods described in the above embodiments.

The receiving device 1400 according to this embodiment may additionally include a recording unit (drive) 1408 for recording various data onto a recording medium, such as a magnetic disk, optical disc, or a non-volatile semiconductor memory. Examples of data to be recorded by the recording unit 1408 include data contained in transport streams that are obtained as a result of demodulation and error correction by the demodulation unit 1402, data equivalent to such data (for example, data obtained by compressing the data), and data obtained by processing the moving pictures and/or audio. (Note here that there may be a case where no error correction is performed by the demodulation unit 1402 and where the receiving device 1400 conducts another signal processing after error correction. The same holds in the following description where similar wording appears.) Note that the term "optical disc" used herein refers to a recording medium, such as Digital Versatile Disc (DVD) or BD (Blu-ray Disc), that is readable and writable with the use of a laser beam. Further, the term "magnetic disk" used herein refers to a recording medium, such as an floppy disk (FD, registered trademark) or hard disk, that is writable by magnetizing a magnetic substance with magnetic flux. Still further, the term "non-volatile semiconductor memory" refers to a recording medium, such as flash memory or ferroelectric random access memory, composed of semiconductor element(s). Specific examples of non-volatile semiconductor memory include an SD card using flash memory and a flash solid state drive (SSD). It should be naturally appreciated that the specific types of recording mediums mentioned herein are merely examples and any other types of recording mediums may be usable.

With the above structure, the user can record a broadcast program that the receiving device 1400 receives with any of the reception methods described in the above embodiments, and time-shift viewing of the recorded broadcast program is possibly anytime after the broadcast.

In the above description of the receiving device 1400, the recording unit 1408 records transport streams obtained by the demodulation unit 1402. However, the recording unit 1408 may record part of data extracted from the data contained in the transport streams. For example, the transport streams demodulated by the demodulation unit 1402 may contain contents of data broadcast service, in addition to the video and audio streams. In this case, new transport streams may be generated by multiplexing the video and audio streams, without the contents of broadcast service, extracted from the transport streams demodulated by the demodulation unit 1402, and the recording unit 1408 may record the newly generated transport streams. In another example, new transport streams may be generated by multiplexing either of the video stream and audio stream contained in the transport streams obtained as a result of demodulation and error correction by the demodulation unit 1402, and the recording unit 1408 may record the newly generated transport streams. In yet another example, the recording unit 1408 may record the contents of data broadcast service included, as described above, in the transport streams.

As described above, the receiving device 1400 described in this embodiment may be included in a TV, a recorder (such as DVD recorder, Blu-ray recorder, HDD recorder, or SD card recorder), or a mobile telephone. In such a case, the transport streams obtained as a result of demodulation and error correction by the demodulation unit 1402 may contain data for correcting errors (bugs) in software used to operate the TV or recorder or in software used to protect personal or confidential information. If such data is contained, the data is installed to the TV or recorder to correct the errors. Further, if data for correcting errors (bugs) in software installed in the receiving device 1400 is contained, such data is used to correct errors that the receiving device 1400 may have. This arrangement ensures more stable operation of the TV, recorder, or mobile phone in which the receiving device 1400 is implemented.

Note that it may be the stream input/output unit 1403 that handles extraction of data from the whole data contained in transport streams obtained as a result of demodulation and error correction by the demodulation unit 1402 and multiplexing of the extracted data. More specifically, under instructions given from a control unit, such as CPU, not illustrated in the figures, the stream input/output unit 1403 demultiplexes a video stream, an audio stream, contents of data broadcast service etc. from the transport streams demodulated by the demodulation unit 1402, and extracts specific pieces of data from the demultiplexed data, and multiplexes the extracted data pieces to generate new transport streams. The data pieces to be extracted from demultiplexed data may be determined by the user or determined in advance for the respective types of recording mediums.

With the above structure, the receiving device 1400 is enabled to extract and record only data necessary to view a recorded broadcast program, which is effective to reduce the size of data to be recorded.

In the above description, the recording unit 1408 records transport streams obtained as a result of demodulation and error correction by the demodulation unit 1402. Alternatively, however, the recording unit 1408 may record new transport streams generated by multiplexing a video stream newly generated by encoding the original video stream contained in the transport streams obtained as a result of demodulation and error correction by the demodulation unit 1402. Here, the moving picture coding method to be employed may be different from that used to encode the original video stream, such that the data size or bit rate of the new video stream is smaller than the original video stream. Here, the moving picture coding method used to generate the new video stream may be of a different standard from that used to generate the original video stream. Alternatively, the same moving picture coding method may be used but with different parameters. Similarly, the recording unit 1408 may record new transport streams generated by multiplexing an audio stream newly obtained by encoding the original audio stream contained in the transport streams obtained as a result of demodulation and error correction by the demodulation unit 1402. Here, the audio coding method to be employed may be different from that used to encode the original audio stream, such that the data size or bit rate of the new audio stream is smaller than the original audio stream.

Note that it may be the stream input/output unit 1403 and the signal processing unit 1404 that perform the process of coding the original video or audio stream contained in the transport streams obtained as a result of demodulation and error correction by the demodulation unit 1402 into the video or audio stream of different data size or bit rate. More specifically, under instructions given from the control unit such as CPU, the stream input/output unit 1403 demultiplexes a video stream, an audio stream, contents of data broadcast service etc. from the transport streams obtained as a result of demodulation and error correction by the demodulation unit 1402. Under instructions given from the control unit, the signal processing unit 1404 encodes the demultiplexed video stream and audio stream respectively using a motion picture coding method and an audio coding method each different from the coding method used to encode the video and audio streams originally contained in the transport streams. Under instructions given from the control unit, the stream input/output unit 1403 multiplexes the newly encoded video stream and audio stream to generate new transport streams. Note that the signal processing unit 1404 may conduct the conversion of either or both of the video or audio stream according to instructions given from the control unit. In addition, the sizes of video and audio streams to be obtained by encoding may be specified by a user or determined in advance for the types of recording mediums.

With the above arrangement, the receiving device 1400 is enabled to record video and audio streams after converting the streams to a size recordable on the recording medium or to a size or bit rate that matches the read or write rate of the recording unit 1408. This arrangement ensures that the recoding unit duly records a broadcast program, even if the transport streams obtained as a result of demodulation and error correction by the demodulation unit 1402 are larger in size than the size recordable on the recording medium or higher in bit rate than the read or write rate of the recording unit. Consequently, time-shift viewing of the recorded broadcast program by the user is possible anytime after the broadcast.

Furthermore, the receiving device 1400 additionally includes a stream output interface (IF) 1409 for transmitting transport streams demodulated by the demodulation unit 1402 to an external device via a transport medium 1430. In one example, the stream output IF 1409 may be a radio communication device that transmits transport streams, which are obtained by demodulation, via a wireless medium (equivalent to the transport medium 1430) to an external device, using a wireless communication method compliant with a wireless communication standard, such as Wi-Fi (registered trademark, a set of standards including IEEE 802.11a, IEEE 802.11g, and IEEE 802.11n), WiGiG, Wireless HD, Bluetooth, or Zigbee. In another example, the stream output IF 1409 may be a wired communication device that transmits transport streams, which are obtained by demodulation, via a transmission line (equivalent to the transport medium 1430) physically connected to the stream output IF 1409 to an external device, using a communication method compliant with wired communication standards, such as Ethernet (registered trademark), USB (Universal Serial Bus), PLC (Power Line Communication), or HDMI (High-Definition Multimedia Interface).

With the above structure, the user can use, on an external device, transport streams received by the receiving device 1400 using the reception method described according to the above embodiments. The usage of transport streams by a user mentioned herein include to use the transport streams for real-time viewing on an external device, to record the transport streams by a recording unit included in an external device, and to transmit the transport streams from an external device to a yet another external device.

In the above description of the receiving device 1400, the stream output IF 1409 outputs transport streams obtained as a result of demodulation and error correction by the demodulation unit 1402. However, the receiving device 1400 may output data extracted from data contained in the transport streams, rather than the whole data contained in the transport streams. For example, transport streams obtained as a result of demodulation and error correction by the demodulation unit 1402 may contain contents of data broadcast service, in addition to video and audio streams. In this case, the stream output IF 1409 may output transport streams newly generated by multiplexing video and audio streams extracted from the transport streams obtained as a result of demodulation and error correction by the demodulation unit 1402. In another example, the stream output IF 1409 may output transport streams newly generated by multiplexing either of the video stream and audio stream contained in the transport streams obtained as a result of demodulation and error correction by the demodulation unit 1402.

Note that it may be the stream input/output unit 1403 that handles extraction of data from the whole data contained in transport streams obtained as a result of demodulation and error correction by the demodulation unit 1402 and multiplexing of the extracted data. More specifically, under instructions given from a control unit, such as CPU, not illustrated in the figures, the stream input/output unit 1403 demultiplexes a video stream, an audio stream, contents of data broadcast service etc. from the transport streams demodulated by the demodulation unit 1402, and extracts specific pieces of data from the demultiplexed data, and multiplexes the extracted data pieces to generate new transport streams. The data pieces to be extracted from demultiplexed data may be determined by the user or determined in advance for the respective types of the stream output IF 1409.

With the above structure, the receiving device 1400 is enabled to extract and output only data necessary for an external device, which is effective to reduce the bandwidth used to output the transport streams.

In the above description, the stream output IF 1409 outputs transport streams obtained as a result of demodulation and error correction by the demodulation unit 1402. Alternatively, however, the stream output IF 1409 may output new transport streams generated by multiplexing a video stream newly obtained by encoding the original video stream contained in the transport streams obtained as a result of demodulation and error correction by the demodulation unit 1402. The new video stream is encoded with a moving picture coding method different from that used to encode the original video stream, such that the data size or bit rate of the new video stream is smaller than the original video stream. Here, the moving picture coding method used to generate new video stream may be of a different standard from that used to generate the original video stream. Alternatively, the same moving picture coding method may be used but with different parameters. Similarly, the stream output IF 1409 may output new transport streams generated by multiplexing an audio stream newly obtained by encoding the original audio stream contained in the transport streams obtained as a result of demodulation and error correction by the demodulation unit 1402. The new audio stream is encoded with an audio coding method different from that used to encode the original audio stream, such that the data size or bit rate of the new audio stream is smaller than the original audio stream.

The process of converting the original video or audio stream contained in the transport streams obtained as a result of demodulation and error correction by the demodulation unit 1402 into the video or audio stream of different data size of bit rate is performed, for example, by the stream input/output unit 1403 and the signal processing unit 1404. More specifically, under instructions given from the control unit, the stream input/output unit 1403 demultiplexes a video stream, an audio stream, contents of data broadcast service etc. from the transport streams obtained as a result of demodulation and error correction by the demodulation unit 1402. Under instructions given from the control unit, the signal processing unit 1404 converts the demultiplexed video stream and audio stream respectively using a motion picture coding method and an audio coding method each different from the method that was used in the conversion applied to obtain the video and audio streams. Under instructions given from the control unit, the stream input/output unit 1403 multiplexes the newly converted video stream and audio stream to generate new transport streams. Note that the signal processing unit 1404 may conduct the conversion of either or both of the video or audio stream according to instructions given from the control unit. In addition, the sizes of video and audio streams to be obtained by conversion may be specified by a user or determined in advance for the types of the stream output IF 1409.

With the above structure, the receiving device 1400 is enabled to output video and audio streams after converting the streams to a bit rate that matches the transfer rate between the receiving device 1400 and an external device. This arrangement ensures that even if transport streams obtained as a result of demodulation and error correction by the demodulation unit 1402 are higher in bit rate than the data transfer rate to an external device, the stream output IF duly outputs new transport streams at an appropriate bit rate to the external device. Consequently, the user can use the new transport streams on another communication device.

Furthermore, the receiving device 1400 also includes the AV output IF 1411 that outputs video and audio signals decoded by the signal processing unit 1404 to an external device via an external transport medium 1440. In one example, the AV output IF 1411 may be a wireless communication device that transmits transport streams, which are obtained by demodulation, via a wireless medium to an external device, using a wireless communication method compliant with wireless communication standards, such as Wi-Fi (registered trademark), which is a set of standards including IEEE 802.11a, IEEE 802.11g, and IEEE 802.11n, WiGiG, Wireless HD, Bluetooth, or Zigbee. In another example, the stream output IF 1409 may be a wired communication device that transmits modulated video and audio signals via a transmission line physically connected to the stream output IF 1409 to an external device, using a communication method compliant with wired communication standards, such as Ethernet (registered trademark), USB, PLC, or HDMI. In yet another example, the stream output IF 1409 may be a terminal for connecting a cable to output the video and audio signals in analog form.

With the above structure, the user is allowed to use on an external device the video and audio signals decoded by the signal processing unit 1404.

Furthermore, the receiving device 1400 additionally includes an operation input unit 1410 for receiving a user operation. According to control signals indicative of user operations input to the operation input unit 1410, the receiving device 1400 performs various operations, such as switching the power ON or OFF, switching the currently selected receive channel to another channel, switching the display of subtitle text ON or OFF, switching the display of subtitle text to another language, changing the volume of audio output of the audio output unit 1406, and changing the settings of channels that can be received.

Additionally, the receiving device 1400 may have a function of displaying the antenna level indicating the quality of the signal being received by the receiving device 1400. Note that the antenna level is an indicator of the reception quality calculated based on, for example, the Received Signal Strength Indication, Received Signal Strength Indicator (RSSI), received field strength, Carrier-to-noise power ratio (C/N), Bit Error Rate (BER), packet error rate, frame error rate, and channel state information of the signal received on the receiving device 1400. In other words, the antenna level is a signal indicating the level and quality of the received signal. In this case, the demodulation unit 1402 also serves the function of a reception quality measuring unit for measuring the received signal characteristics, such as RSSI, the received field strength, C/N, BER, packet error rate, frame error rate, and channel state information. In response to a user operation, the receiving device 1400 displays the antenna level (i.e., signal indicating the level and quality of the received signal) on the video display unit 1407 in a manner identifiable by the user. The antenna level (i.e., signal indicating the level and quality of the received signal) may be numerically displayed using a number that represents the RSSI, received field strength, C/N, BER, packet error rate, frame error rate, channel state information or the like. Alternatively, the antenna level may be displayed using an image representing the RSSI, received field strength, C/N, BER, packet error rate, frame error rate, channel state information or the like.

Let us assume the following case: when the broadcast station (base station) 1115 transmits a plurality of elementary streams constituting a program (e.g., one or more video streams, one or more audio streams, and one or more metadata streams), a hierarchical transmission method is achieved by (i) setting the forward error correction coding rate, constellation size based on a modulation method, interleaving length and other physical layer parameters separately for each individual physical layer pipe, and (ii) specifying a robustness level separately for each individual physical layer pipe. In this case, the receiving device 1400 may be configured in the following manners. The receiving device 1400 may have the functions of, for example, (i) calculating indices that respectively indicate a plurality of reception qualities for a plurality of hierarchies, and (ii) displaying the calculated indices as a plurality of antenna levels (signals that indicate levels and superior/inferior qualities of received signals, respectively), either all at once or by switching from display of one index to display of another index. Alternatively, the receiving device 1400 may have the functions of (i) calculating an index indicating a reception quality for all or some of the hierarchies, and (ii) displaying the calculated index as an antenna level (a signal indicating a level and a superior/inferior quality of the received signals).

In a case where the signals are received by using any of the reception methods described in the above embodiments, the above structure enables the user to numerically or visually grasp an antenna level (a signal indicating a level and a superior/inferior quality of the received signals) either for each hierarchy or for each hierarchy group made up of two or more hierarchies.

Also, the receiving device 1400 may have the function of switching between elementary streams to be played back (decoded) according to a reception condition of each elementary stream constituting the program being viewed, or the function of displaying the reception condition of each elementary stream constituting such a program. In a case where the broadcast station (base station) 1115 achieves a hierarchical transmission method by (i) setting the forward error correction coding rate, constellation size based on a modulation method, interleaving length and other physical layer parameters separately for each individual physical layer pipe and (ii) specifying a robustness level separately for each individual physical layer pipe, there is a possibility that a reception condition may differ for each PLP in the receiving device 1400. For example, assume a case where a plurality of elementary streams constituting a program are transmitted over a first physical layer pipe and a second physical layer pipe that has a lower robustness level than the first physical layer pipe. In this case, depending on the receiving environment, there is a possibility that an elementary stream(s) transmitted over the first physical layer pipe is received/obtained in a good reception condition, whereas an elementary stream(s) transmitted over the second physical layer pipe is received/obtained in a poor reception condition. At this time, the receiving device 1400 judges whether the reception condition is good or poor based on, for example, (i) pieces of information such as the RSSI, field strength, C/N, BER, packet error rate, and frame error rate of the received signals, and channel state information of the received signals, and (ii) pieces of robustness level information set in the physical layer pipes over which the elementary streams are transmitted. Alternatively, the receiving device 1400 may perform the above judgment as to whether the reception condition is good or poor based on the following criterion: whether the error rate of a baseband frame of each elementary stream or the error rate of a TS packet of each elementary stream per unit of time, is (i) larger than or equal to a predetermined threshold value, or (ii) smaller than the predetermined threshold value. For each of the plurality of elementary streams constituting the program, the demodulation unit 1402 of the receiving device 1400 judges whether the reception condition of the elementary stream is good or poor and outputs a signal indicating the judged reception condition. Based on the signals indicating the reception conditions of the elementary streams, the receiving device 1400 performs control of switching between elementary streams to be decoded by the signal processing unit 1404, control of displaying information indicating a reception condition of the program on the video display unit 1407, etc.

The following explains one example of operations performed by the receiving device 1400 when the plurality of elementary streams constituting the program include a plurality of video streams. It is assumed here that the plurality of elementary streams constituting the program include a first video stream obtained by encoding low-definition video and a second video stream obtained by encoding high-definition video (differential data used to play back the high-definition video in succession to the low-definition video). It is also assumed here that a physical layer pipe over which the first video stream is transmitted has a higher robustness level than a physical layer pipe over which the second video stream is transmitted, and that the reception condition of the first video stream is always better than or equal to the reception condition of the second video stream. When the reception condition of the second video stream is good, the signal processing unit 1404 of the receiving device 1400 performs decoding by using both of the first and second video streams, and the receiving device 1400 displays a high-definition video signal obtained through the decoding on the video display unit 1407. On the other hand, when the reception condition of the second video stream is poor, the signal processing unit 1404 of the receiving device 1400 performs decoding by using the first video stream only, and the receiving device 1400 displays a low-definition video signal obtained through the decoding on the video display unit 1407.

When the reception condition of the second video stream is poor, the above structure allows stably displaying low-definition video to the user instead of rough high-definition video.

It should be noted that according to the above structure, the receiving device 1400 does not judge whether the reception condition of the first video stream is good or poor. This is because, even if the reception condition of the first video stream is poor, displaying the low-definition video obtained by decoding the first video stream is thought to be more preferable than not displaying the video of the first video stream by stopping the decoding of the first video stream, even with presence of roughness or interruption in the video of the first video stream. However, it goes without saying that the receiving device 1400 may judge whether the reception condition is good or poor for both of the first and second video streams and switch between elementary streams to be decoded by the signal processing unit 1404 based on a result of the judgment. In this case, when the reception conditions of the first and second video streams are both good, the signal processing unit 1404 of the receiving device 1400 performs decoding by using both of the first and second video streams, and the receiving device 1400 displays a high-definition video signal obtained through the decoding on the video display unit 1407. On the other hand, when the reception condition of the second video stream is poor but the reception condition of the first video stream is good, the signal processing unit 1404 of the receiving device 1400 performs decoding by using the first video stream, and the receiving device 1400 displays a low-definition video signal obtained through the decoding on the video display unit 1407. On the other hand, when the reception conditions of the first and second video streams are both poor, the receiving device 1400 stops the decoding processing, i.e., does not decode the first and second video streams. The above structure can suppress the power consumption by stopping the decoding processing when the reception conditions of the first and second video streams are both so poor that the user cannot figure out what the video is about upon display of the decoded first video stream.

With respect to the above structure, the receiving device 1400 may judge whether the reception condition of the first video stream is good or poor based on a criterion different from a criterion based on which whether the reception condition of the second video stream is good or poor.

For example, when judging whether the reception conditions of the first and second video streams are good or poor based on the error rate of a baseband frame of each video stream or the error rate of a TS packet of each video stream per unit of time, the receiving device 1400 makes a first threshold value that is used in judging whether the reception condition of the first video stream is good or poor larger than a second threshold value that is used in judging whether the reception condition of the second video stream is good or poor.

Also, the receiving device 1400 may perform the judgment as to whether the reception condition of the second video stream is good or poor based on the error rate of a baseband frame of the second video stream or the error rate of a TS packet of the second video stream per unit of time, while performing the judgment as to whether the reception condition of the first video stream is good or poor based on whether the L1-pre signalling and L1-post signalling discussed in the above embodiments have been received or not. Also, the receiving device 1400 may perform the judgment as to whether the reception condition of the second video stream is good or poor based on the error rate of a baseband frame of the second video stream or the error rate of a TS packet of the second video stream per unit of time, while performing the judgment as to whether the reception condition of the first video stream is good or poor based on pieces of information such as the RSSI, field strength, and C/N of the received signals. The above structure allows setting a criterion for stopping the decoding of the video streams for each video stream.

It has been described above that the video stream obtained by encoding low-definition video and the video stream obtained by encoding high-definition video are transmitted over different PLPs having different robustness levels. Similarly, combinations of other elementary streams may also be transmitted over different PLPs having different robustness levels. For example, in the case of a plurality of video streams that are respectively obtained by encoding a plurality of moving pictures which make up 3D video with different viewing angles, such video streams may be transmitted over different PLPs having different robustness levels. A video stream and an audio stream may be transmitted over different PLPs having different robustness levels. The receiving device 1400 can achieve the effects that are similar to the effects of the above structure by selecting, from among the received elementary streams, an elementary stream(s) that has been judged to be in a good reception condition, and playing back (decoding) the selected elementary stream(s).

In a case where the playback (decoding) is not performed with use of the elementary streams constituting the program due to poor reception conditions of part of the elementary streams, the receiving device 1400 may multiplex a text or an image indicating the part of the elementary streams with poor reception conditions or the rest of the elementary streams with good reception conditions, and then display the text or the image on the video display unit 1407. For example, in a case where a program being broadcast as high-definition video is displayed as low-definition video, the above structure enables the user to easily acknowledge that the low-definition video is displayed because of poor reception conditions.

It has been described above that the demodulation unit 1402 judges the reception condition for each of the plurality of elementary streams constituting the program. Alternatively, the signal processing unit 1404 may judge whether or not each elementary stream has been received based on a value of a transport error identifier appended to each TS packet of input video streams and audio streams.

Although the receiving device 1400 is described above as having the audio output unit 1406, video display unit 1407, recording unit 1408, stream output IF 1409, and AV output IF 1411, it is not necessary that the receiving device 1400 has all of these units. As long as the receiving device 1400 is provided with at least one of the units 1406-1411 described above, the user is enabled to use transport streams obtained as a result of demodulation and error correction by the demodulation unit 1402. It is therefore applicable that the receiving device 1400 has one or more of the above-described units in any combination depending on its application.

Transport Streams

The following is a detailed description of an exemplary structure of a transport stream.

FIG. 15 is a view illustrating an exemplary transport stream structure. As illustrated in FIG. 15, a transport stream is obtained by multiplexing one or more of elementary streams, which are elements constituting a broadcast program (program or an event which is part of a program) currently provided through respective services. Examples of elementary streams include a video stream, audio stream, presentation graphic (PG) stream, and interactive graphic (IG) stream. In the case where a broadcast program carried by transport stream(s) is a movie, the video streams represent main video and sub video of the movie, the audio streams represent main audio of the movie and sub audio to be mixed with the main audio, and the PG stream represents subtitles of the movie. The term "main video" used herein refers to video images normally presented on a screen, whereas "sub video" refers to video images (for example, images of text explaining the outline of the movie) to be presented in a small window inserted within the video images. The IG stream represents an interactive display constituted by presenting GUI components on a screen.

Each stream contained in a transport stream is identified by an identifier called PID uniquely assigned to the stream. For example, the video stream carrying main video images of a movie is assigned with "00x1011", each audio stream is assigned with a different one of "0x1100" to "0x111F", each PG stream is assigned with a different one of "0x1200" to "0x121F", each IG stream is assigned with a different one of "0x1400" to "0x141F", each video stream carrying sub video images of the movie is assigned with a different one of "0x1B00" to "0x1B1F", each audio stream of sub-audio to be mixed with the main audio is assigned with a different one of "0x1A00" to "0x1A1F".

FIG. 16 is a schematic view illustrating an example of how a transport stream is multiplexed. First, a video stream 1601 composed of a plurality of video frames is converted into a PES packet sequence 1602 and then into a TS packet sequence 1603, whereas an audio stream 1604 composed of a plurality of audio frames is converted into a PES packet sequence 1605 and then into a TS packet sequence 1606. Similarly, the PG stream 1611 is first converted into a PES packet sequence 1612 and then into a TS packet sequence 1613, whereas the IG stream 1614 is converted into a PES packet sequence 1615 and then into a TS packet sequence 1616. The transport stream 1617 is obtained by multiplexing the TS packet sequences (1603, 1606, 1613 and 1616) into one stream.

FIG. 17 illustrates the details of how a video stream is divided into a sequence of PES packets. In FIG. 17, the first tier shows a sequence of video frames included in a video stream. The second tier shows a sequence of PES packets. As indicated by arrows yy1, yy2, yy3, and yy4 shown in FIG. 17, a plurality of video presentation units, namely I pictures, B pictures, and P pictures, of a video stream are separately stored into the payloads of PES packets on a picture-by-picture basis. Each PES packet has a PES header and the PES header stores a Presentation Time-Stamp (PTS) and Decoding Time-Stamp (DTS) indicating the display time and decoding time of a corresponding picture.

FIG. 18 illustrates the format of a TS packet to be eventually loaded to a transport stream. The TS packet is a fixed length packet of 188 bytes and has a 4-byte TS header containing such information as PID identifying the stream and a 184-byte TS payload carrying actual data. The PES packets described above are divided to be stored into the TS payloads of TS packets. In the case of BD-ROM, each TS packet is attached with a TP extra header of 4 bytes to build a 192-byte source packet, which is to be loaded to a transport stream. The TP extra header contains such information as arrival time stamp (ATS). The ATS indicates a time for starring transfer of the TS packet to the PID filter of a decoder. As shown on the lowest tier in FIG. 18, a transport stream includes a sequence of source packets each bearing a source packet number (SPN), which is a number incrementing sequentially from the start of the transport stream.

In addition to the TS packets storing streams such as video, audio, and PG streams, a transport stream also includes TS packets storing a Program Association Table (PAT), a Program Map Table (PMT), and a Program Clock Reference (PCR). The PAT in a transport stream indicates the PID of a PMT used in the transport stream, and the PID of the PAT is "0". The PMT includes PIDs identifying the respective streams, such as video, audio and subtitles, contained in a transport stream and attribute information (frame rate, aspect ratio, and so on) of the streams identified by the respective PIDs. In addition, the PMT includes various types of descriptors relating to the transport stream. One of such descriptors may be copy control information indicating whether or not copying of the transport stream is permitted. The PCR includes information for synchronizing the Arrival Time Clock (ATC), which is the time axis of ATS, with the System Time Clock (STC), which is the time axis of PTS and DTS. More specifically, the PCR packet includes information indicating an STC time corresponding to the ATS at which the PCR packet is to be transferred.

FIG. 19 is a view illustrating the data structure of PMT in detail. The PMT starts with a PMT header indicating the length of data contained in the PMT. Following the PMT header, descriptors relating to the transport stream are disposed. One example of a descriptor included in the PMT is copy control information described above. Following the descriptors, pieces of stream information relating to the respective streams included in the transport stream are arranged. Each piece of stream information is composed of stream descriptors indicating a stream type identifying a compression codec employed for a corresponding stream, a PID of the stream, and attribute information (frame rate, aspect ratio, and the like) of the stream. The PMT includes as many stream descriptors as the number of streams included in the transport stream.

When recorded onto a recoding medium, for example, the transport stream is recorded along with a transport stream information file.

FIG. 20 is a view illustrating the structure of the transport stream information file. As illustrated in FIG. 20, the transport stream information file is management information of a corresponding transport stream and composed of transport stream information, stream attribute information and an entry map. Note that transport stream information files and transport streams are in a one-to-one relationship.

As illustrated in FIG. 20, the transport stream information is composed of a system rate, playback start time, and playback end time. The system rate indicates the maximum transfer rate of the transport stream to the PID filter of a system target decoder, which will be described later. The transport stream includes ATSs at intervals set so as not to exceed the system rate. The playback start time is set to the time specified by the PTS of the first video frame in the transport stream, whereas the playback end time is set to the time calculated by adding the playback period of one frame to the PTS of the last video frame in the transport stream.

FIG. 21 illustrates the structure of stream attribute information contained in a transport stream information file. As illustrated in FIG. 21, the stream attribute information includes pieces of attribute information of the respective streams included in a transport stream and each attribute information is registered with a corresponding PID. That is, different pieces of attribute information are provided for different streams, namely a video stream, an audio stream, a PG stream and an IG stream. The video stream attribute information indicates the compression codec employed to compress the video stream, the resolutions of individual pictures constituting the video stream, the aspect ratio, the frame rate, and so on. The audio stream attribute information indicates the compression codec employed to compress the audio stream, the number of channels included in the audio stream, the language of the audio stream, the sampling frequency, and so on. These pieces of information are used to initialize a decoder before playback by a player.

In the present embodiment, from among the pieces of information included in the user packet information file, the stream type included in the PMT is used. In the case where the user packet is recorded on a recording medium, the video stream attribute information included in the user packet information file is used. More specifically, the moving picture coding method and device described in any of the above embodiments may be modified to additionally include a step or unit of setting a specific piece of information in the stream type included in the PMT or in the video stream attribute information. The specific piece of information is for indicating that the video data is generated by the moving picture coding method and device described in the embodiment. With the above structure, video data generated by the moving picture coding method and device described in any of the above embodiments is distinguishable from video data compliant with other standards.

FIG. 22 illustrates an exemplary structure of a video and audio output device 1900 that includes a receiving device 1904 for receiving a modulated signal carrying video and audio data or data for data broadcasting from a broadcasting station (base station). Note that the structure of the receiving device 1904 is basically same as the receiving device 1400 illustrated in FIG. 14. The video and audio output device 1900 is installed with an Operating System (OS), for example, and also with a communication unit 1906 (a device for wireless Local Area Network (LAN) or Ethernet (registered trademark), for example) for establishing Internet connection. With this structure, hypertext (World Wide Web (WWW)) 1903 provided over the Internet can be displayed on a display area 1901 simultaneously with images 1902 reproduced on the display area 1901 from the video and audio data or data provided by data broadcasting. By operating a remote control (which may be a mobile phone or keyboard) 1907, the user can make a selection on the images 1902 reproduced from data provided by data broadcasting or the hypertext 1903 provided over the Internet to change the operation of the video and audio output device 1900. For example, by operating the remote control to make a selection on the hypertext 1903 provided over the Internet, the user can change the WWW site currently displayed to another site. Alternatively, by operating the remote control 1907 to make a selection on the images 1902 reproduced from the video or audio data or data provided by the data broadcasting, the user can transmit information indicating the selected channel (such as selected broadcast program or audio broadcasting). In response, an interface (IF) 1905 acquires information transmitted from the remote control 1907, so that the receiving device 1904 operates to obtain reception data by demodulation and error correction of a signal carried on the selected channel. At the time of data reception, the receiving device 1904 receives control symbols containing information indicating a transmission method of a signal carried on the selected channel, so that the information indicative of the transmission method is obtained. With the information, the receiving device 1904 is enabled to make appropriate settings for the receiving operation, demodulation method, and error correction method to duly receive transport streams transmitted from a broadcast station (base station). Although the above description is directed to an example in which the user selects a channel using the remote control 1907, the same description applies to an example in which the user selects a channel using a selection key provided on the video and audio output device 1900.

In addition, the video and audio output device 1900 may be operated via the Internet. For example, a terminal connected to the Internet is used to make settings on the video and audio output device 1900 for pre-programmed recording (storing). (The video and audio output device 1900 therefore has the recording unit 1408 as illustrated in FIG. 14.) Before starting the pre-programmed recording, the video and audio output device 1900 selects the channel, so that the receiving device 1904 operates to obtain reception data by demodulation and error correction of a signal carried on the selected channel. At the time of data reception, the receiving device 1904 receives control symbols containing information indicating a transmission method of a signal carried on the selected channel, so that the information indicative of the transmission method is obtained. With the information, the receiving device 1904 is enabled to make appropriate settings for the receiving operation, demodulation method, and error correction method to duly receive transport streams transmitted from a broadcast station (base station).

INDUSTRIAL APPLICABILITY

The transmission method pertaining to the present invention contributes to highly efficient and flexible signalling.

REFERENCE SIGNS LIST 101 baseband frame
102 bit length of baseband frame
105 FEC frame
106 bit length of FEC frame
110 baseband frame header (BBHDR)
111 bit length of baseband frame header
120 data field
121 data field length
130 padding and/or in-band signalling field
131 bit length of padding and/or in-band signalling field
140 field for BCH parity bit
141 BCH parity bit length 150 field for LDPC parity bit
151 LDPC parity bit length
161 bit length obtained after BCH coding
201 baseband frame header of normal mode
202 baseband frame header of high efficiency mode
310 P1 signalling
320 L1 pre-signalling
330 L1 post-signalling
340 configurable part (configurable) of L1 post-signalling
350 dynamic part (dynamic) of L1 post-signalling
360 S1 field of P1 signalling
370 S2 field 1 of P1 signalling
380 S2 field 2 of P1 signalling
410 table showing parameters of S1 field in P1 signalling
510 table showing parameters of S1 and S2 fields in P1 signalling
610 table showing combinations of signalling parameters of the S1 field, S2 field 1, and S2 field 2 in P1 signalling, and the meanings of such combinations
620 table showing combinations of signalling parameters of the S1 field, S2 field 1, and S2 field 2 in P1 signalling, and the meanings of such combinations
1010 user packet (UP)
1020 length of "UP Size"
1030 separating line
1100 digital broadcast system
1110 transmitting apparatus
1115 transmitting station
1120 personal computer (one example of receiving apparatus)
1130 STB
1140 TV
1150 TV
1200 transmitting apparatus
1220 L1 signalling processing unit
1231 PLP processing unit
1232 PLP processing unit
1233 PLP processing unit
1240 multiplexer
1250 OFDM modulation unit
1260 P1 symbol insertion unit
1300 receiver
1310 demodulation unit
1320 PLP extraction unit
1330 PLP decode unit
1340 control unit
1350 L1 signalling decode unit
1360 P1 detection unit
1400 receiving device
1401 tuner
1402 demodulation unit
1403 stream input/output unit
1404 signal processing unit
1405 AV output unit
1406 audio output unit
1407 video display unit
1408 recording unit
1409 stream output IF
1410 operation input unit
1411 AV output IF
1430, 1440 transport medium
1450 remote control
1460 antenna
1601 video stream
1602, 1605, 1612, 1615 PES packet sequence
1603, 1606, 1613, 1616 TS packet sequence
1604 audio stream
1611 presentation graphic (PG) stream
1614 interactive graphic (IG) stream
1617 transport stream
1900 video and audio output device
1901 display area
1902 images
1903 hypertext
1904 receiving device
1905 interface (IF)
1906 communication unit
1907 remote control

The invention claimed is:

1. A transmitting apparatus, comprising
a transmitting unit configured to:
replace a packet identifier (PID) with a one-bit indicator for a physical layer pipe (PLP); and
multiplex a plurality of data streams and signaling data for transmission, each data stream of the plurality of data streams including a plurality of transport stream packets having stored therein user data, the signaling data including a PLP_PAYLOAD$_{13}$ TYPE indicator for each PLP of a plurality of PLPs, the PLP$_{13}$ PAYLOAD$_{13}$ TYPE indicator being a five-bit long parameter indicating a format of a data stream carried by the PLP indicated by the PLP_PAYLOAD_TYPE indicator, wherein
one of the PLPs whose PLP PAYLOAD TYPE indicator has a first value carries one of the plurality of data streams including a plurality of transport stream packets each having a header with a PID, and
one of the PLPs whose PLP_PAYLOADTYPE indicator has a second value carries one of the plurality of data streams including a plurality of transport stream packets each having a header with a one-bit indicator that is a replacement for a PID of the transport stream packet, the transmitting unit having replaced the PID with the one-bit indicator, and that indicates whether the transport stream packet is a NULL packet or not, and the replaced PIDs of the plurality of transport stream packets of the data stream assigned to the PLP have a same value, and the values of the replaced PIDs are signaled in a layer 1 signaling area different from the plurality of transport stream packets.

2. A transmitting method, comprising steps of:
replacing a packet identifier (PID) with a one-bit indicator for a physical layer pipe (PLP), and
multiplexing a plurality of data streams and signaling data for transmission, each data stream of the plurality of data streams including a plurality of transport stream packets having stored therein user data, the signaling data including a PLP_PAYLOAD_TYPE indicator for each PLP of a plurality of PLPs, the PLP_PAYLOAD_TYPE indicator being a five-bit long parameter indicating a format of a data stream carried by the PLP indicated by the PLP_PAYLOAD_TYPE indicator, wherein
one of the PLPs whose PLP_PAYLOAD_TYPE indicator has a first value carries one of the plurality of data streams including a plurality of transport stream packets each having a header with a PID, and
one of the PLPs whose PLP_PAYLOAD_TYPE indicator has a second value carries one of the plurality of data streams including a plurality of transport stream packets each having a header with a one-bit indicator that is a replacement for a PID of the transport stream packet, the replacing having replaced the PID with the one-bit indicator, and that indicates whether the transport stream packet is a NULL packet or not, and the replaced PIDs of the plurality of transport stream packets of the data stream assigned to the PLP have a same value, and the values of the replaced PIDs are signaled in a layer 1 signaling area different from the plurality of transport stream packets.

3. A receiving apparatus, comprising:

a receiving unit configured to receive a signal including a plurality of data streams and signaling data, each data stream of the plurality of data streams including a plurality of transport stream packets having stored therein user data, the signaling data including a PLP_PAYLOAD_TYPE indicator for each physical layer pipe (PLP) of a plurality of PLPs, the PLP_PAYLOAD_TYPE indicator being a five-bit long parameter indicating a format of a data stream carried by the PLP indicated by the PLP_PAYLOAD_TYPE indicator, one of the PLPs whose PLP_PAYLOAD_TYPE indicator has a first value carrying one of the plurality of data streams including a plurality of transport stream packets each having a header with a packet identifier (PID), where one of the PLPs whose PLP_PAYLOAD_TYPE indicator has a second value carries one of the plurality of data streams including a plurality of transport stream packets each having a header with a one-bit indicator that is a replacement for a PID of the transport stream packet, a transmitting unit having replaced the PID with the one-bit indicator, and that indicates whether the transport stream packet is a NULL packet or not, and the replaced PIDs of the plurality of transport stream packets of the data stream assigned to the PLP have a same value, and the values of the replaced PIDs are signaled in a layer 1 signaling area different from the plurality of transport stream packets;

a signaling data decode unit configured to decode the signaling data; and a PLP decode unit configured to decode the plurality of PLPs according to the decoded signaling data, and decode the PLP whose PLP_PAYLOAD_TYPE indicator has the second value by inserting the PIDs that are signaled in the layer 1 signaling area different from the plurality of transport stream packets as the PIDs of the plurality of transport stream packets.

4. A receiving method, comprising steps of:

receiving a signal including a plurality of data streams and signaling data, each data stream of the plurality of data streams including a plurality of transport stream packets having stored therein user data, the signaling data including a PLP_PAYLOAD_TYPE indicator for each physical layer pipe (PLP) of a plurality of PLPs, the PLP_PAYLOAD_TYPE indicator being a five-bit long parameter indicating a format of a data stream carried by the PLP indicated by the PLP_PAYLOAD_TYPE indicator, one of the PLPs whose PLP_PAYLOAD_TYPE indicator has a first value carrying one of the plurality of data streams including a plurality of transport stream packets each having a header with a packet identifier (PID), where one of the PLPs whose PLP_PAYLOAD_TYPE indicator has a second value carries one of the plurality of data streams including a plurality of transport stream packets each having a header with a one-bit indicator that is a replacement for a PID of the transport stream packet, a transmitting unit having replaced the PID with the one-bit indicator, and that indicates whether the transport stream packet is a NULL packet or not, and the replaced PIDs of the plurality of transport stream packets of the data stream assigned to the PLP have a same value, and the values of the replaced PIDs are signaled in a layer 1 signaling area different from the plurality of transport stream packets;

decoding the signaling data; and decoding the plurality of PLPs according to the decoded signaling data, and decoding the PLP whose PLP_PAYLOAD_TYPE indicator has the second value by inserting the PIDs that are signaled in the layer 1 signaling area different from the plurality of transport stream packets as the PIDs of the plurality of transport stream packets.

* * * * *